(12) United States Patent  
Urban et al.

(10) Patent No.: US 7,280,646 B2  
(45) Date of Patent: Oct. 9, 2007

(54) DYNAMIC CALLER ID MESSAGING

(75) Inventors: Blake R. Urban, Hickory, NC (US); Isaac D. M. White, Groveland, FL (US); James E. Dickens, Ocoee, FL (US); Kevin Forsberg, Orlando, FL (US); Charles Sawyer, Orlando, FL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 10/418,768

(22) Filed: Apr. 18, 2003

(65) Prior Publication Data

US 2004/0208301 A1    Oct. 21, 2004

(51) Int. Cl.
*H04M 1/56* (2006.01)
*H04M 15/06* (2006.01)
*H04M 11/00* (2006.01)
*H04M 3/42* (2006.01)

(52) U.S. Cl. .................... 379/142.01; 379/142.04; 379/142.17; 379/88.13; 455/415

(58) Field of Classification Search ......... 379/142.01, 379/142.04, 142.07, 142.08, 142.1, 142.13, 379/142.16, 142.17, 93.23, 67.1, 68, 88.02, 379/88.11, 88.12, 88.13, 88.18, 88.19, 88.21, 379/88.22, 88.25; 455/414.1, 415
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A | 1/1989 | Szlam et al. | |
| 4,802,202 A | 1/1989 | Takahashi et al. | |
| 4,817,133 A | 3/1989 | Takahashi et al. | |

(Continued)

FOREIGN PATENT DOCUMENTS

WO    WO97/50225    12/1997

(Continued)

OTHER PUBLICATIONS

International Search Report, PCT/US02/30068, Dec. 9, 2002.

(Continued)

*Primary Examiner*—Quoc Tran
(74) *Attorney, Agent, or Firm*—Cantor Colburn LLP

(57) ABSTRACT

Methods, systems, and apparatuses for caller identification messaging are disclosed. According to one embodiment, a calling party uses a Caller ID Messaging Device that supplants the incoming calling line identification (ICLID) signal with a Caller ID Messaging Signal and transmits the Caller ID Messaging Signal to a destination communications address. An alternate embodiment provides that the calling party may use a conventional telephone to access a communications network, activate Caller ID Messaging Services, compose or retrieve a stored Caller ID Message of the Caller ID Messaging Signal, and transmit the Caller ID Messaging Signal to the destination communications address. The Caller ID Message and Caller ID Messaging Signal may include text, video, voice, and/or digital data.

15 Claims, 20 Drawing Sheets

U.S. PATENT DOCUMENTS

| | | | |
|---|---|---|---|
| 4,823,304 A | 4/1989 | Frantz et al. |
| 4,845,743 A | 7/1989 | Lutz |
| 4,850,013 A | 7/1989 | Rose |
| 4,995,075 A | 2/1991 | Angiolillo-Bent |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow |
| D338,889 S | 8/1993 | Fuqua |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,333,152 A | 7/1994 | Wilber |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | de Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,523 A | 12/1997 | Li et al. |
| 5,701,301 A | 12/1997 | Weisser, Jr. |
| 5,703,934 A | 12/1997 | Zicker et al. |
| 5,724,412 A | 3/1998 | Srinivasan |
| 5,734,706 A | 3/1998 | Windsor et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan |
| 5,802,160 A | 9/1998 | Kugell |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,878,036 A | 3/1999 | Spartz et al. |
| 5,883,942 A | 3/1999 | Lim et al. |
| 5,884,144 A | 3/1999 | Chavz et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,923,744 A | 7/1999 | Cheng |
| 5,930,701 A | 7/1999 | Skog |
| 5,940,484 A | 8/1999 | DeFazio et al. |
| 5,946,363 A | 8/1999 | Rominger et al. |
| 5,946,684 A | 8/1999 | Lund |
| D413,605 S | 9/1999 | Thomas |
| 5,948,040 A | 9/1999 | DeLorme et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |
| 6,058,171 A | 5/2000 | Hoopes |
| 6,061,434 A | 5/2000 | Corbett |

| | | |
|---|---|---|
| 6,061,566 A | 5/2000 | Friman |
| 6,064,876 A | 5/2000 | Ishida |
| 6,065,844 A | 5/2000 | Chen |
| 6,072,859 A | 6/2000 | King |
| 6,078,581 A | 6/2000 | Shtivelman et al. |
| 6,091,947 A | 7/2000 | Sumner |
| 6,094,478 A | 7/2000 | Shepherd et al. |
| 6,094,573 A | 7/2000 | Heinonen et al. |
| 6,094,574 A | 7/2000 | Vance et al. |
| 6,094,575 A | 7/2000 | Anderson et al. |
| 6,101,246 A | 8/2000 | Heinmiller et al. |
| 6,104,784 A | 8/2000 | Robbins |
| 6,104,800 A | 8/2000 | Benson |
| 6,108,630 A | 8/2000 | Kuechler et al. |
| 6,111,939 A | 8/2000 | Brabanec |
| 6,134,235 A | 10/2000 | Goldman et al. |
| 6,134,311 A | 10/2000 | Ekstrom |
| 6,137,870 A | 10/2000 | Scherer |
| 6,137,871 A | 10/2000 | Maier et al. |
| 6,141,341 A | 10/2000 | Jones |
| 6,141,409 A | 10/2000 | Madoch et al. |
| 6,144,644 A | 11/2000 | Bajzath et al. |
| 6,154,531 A | 11/2000 | Clapper |
| 6,160,876 A | 12/2000 | Moss et al. |
| 6,161,021 A | 12/2000 | Akpa |
| 6,163,595 A | 12/2000 | Parker et al. |
| 6,163,691 A | 12/2000 | Buettner et al. |
| 6,167,254 A | 12/2000 | Chavez, Jr. et al. |
| 6,173,049 B1 | 1/2001 | Malik |
| 6,178,232 B1 | 1/2001 | Latter et al. |
| 6,181,928 B1 | 1/2001 | Moon |
| D437,879 S | 2/2001 | Weinandt |
| 6,185,289 B1 | 2/2001 | Hetz et al. |
| 6,192,115 B1 | 2/2001 | Toy et al. |
| 6,192,116 B1 | 2/2001 | Mayak |
| 6,198,480 B1 | 3/2001 | Cotugno et al. |
| 6,198,920 B1 | 3/2001 | Doviak et al. |
| 6,202,023 B1 | 3/2001 | Hancock et al. |
| 6,219,407 B1 | 4/2001 | Kanevsky et al. |
| 6,226,367 B1 | 5/2001 | Smith et al. |
| 6,226,369 B1 | 5/2001 | Lim et al. |
| 6,226,399 B1 | 5/2001 | Robinson |
| 6,230,006 B1 | 5/2001 | Keenan et al. |
| 6,233,325 B1 | 5/2001 | Frech et al. |
| 6,236,975 B1 | 5/2001 | Boe et al. |
| 6,243,448 B1 | 6/2001 | Corbett et al. |
| 6,243,461 B1 | 6/2001 | Hwang |
| 6,252,952 B1 | 6/2001 | Kung et al. |
| 6,256,671 B1 | 7/2001 | Strentzsch et al. |
| 6,262,987 B1 | 7/2001 | Mogul |
| 6,266,399 B1 | 7/2001 | Weller et al. |
| 6,278,704 B1 | 8/2001 | Creamer et al. |
| 6,278,862 B1 | 8/2001 | Henderson |
| 6,282,275 B1 | 8/2001 | Gurbani et al. |
| 6,292,479 B1 | 9/2001 | Bartholomew et al. |
| 6,292,549 B1 | 9/2001 | Lung et al. |
| 6,295,502 B1 | 9/2001 | Hancock et al. |
| 6,301,350 B1 | 10/2001 | Henningson et al. |
| 6,304,644 B2 | 10/2001 | Karnowski |
| 6,310,943 B1 | 10/2001 | Kowalski |
| 6,311,057 B1 | 10/2001 | Barvesten |
| 6,317,488 B1 | 11/2001 | DePond et al. |
| 6,317,781 B1 | 11/2001 | DeBoor et al. |
| 6,324,263 B1 | 11/2001 | Sherwood et al. |
| 6,324,271 B1 | 11/2001 | Sawyer et al. |
| 6,327,347 B1 | 12/2001 | Gutzmann |
| 6,332,021 B2 | 12/2001 | Latter et al. |
| 6,333,973 B1 | 12/2001 | Smith et al. |
| 6,339,639 B1 | 1/2002 | Henderson |
| 6,341,161 B1 | 1/2002 | Latter et al. |
| 6,345,187 B1 | 2/2002 | Berthoud et al. |
| 6,347,136 B1 | 2/2002 | Horan |
| 6,351,637 B1 | 2/2002 | Lee |
| 6,353,664 B1 | 3/2002 | Cannon et al. |
| 6,363,411 B1 | 3/2002 | Dugan et al. |
| 6,366,661 B1 | 4/2002 | Devillier et al. |
| 6,366,772 B1 | 4/2002 | Arnson |
| 6,377,807 B1 | 4/2002 | Iparrea et al. |
| 6,377,979 B1 | 4/2002 | Yamashita |
| 6,389,124 B1 | 5/2002 | Schnarel et al. |
| 6,400,809 B1 | 6/2002 | Bossemeyer, Jr. et al. |
| 6,400,947 B1 | 6/2002 | Bright et al. |
| 6,404,868 B1 | 6/2002 | Beamish et al. |
| 6,404,875 B2 | 6/2002 | Malik et al. |
| 6,411,692 B1 | 6/2002 | Scherer |
| 6,421,425 B1 | 7/2002 | Bossi et al. |
| 6,422,263 B1 | 7/2002 | Spicer |
| 6,427,003 B1 | 7/2002 | Corbett et al. |
| 6,427,064 B1 | 7/2002 | Henderson |
| 6,434,394 B1 | 8/2002 | Grundvig et al. |
| 6,437,879 B1 | 8/2002 | Temple |
| 6,438,216 B1 | 8/2002 | Aktas |
| 6,438,584 B1 | 8/2002 | Powers |
| 6,442,249 B1 | 8/2002 | Miller, Jr. |
| 6,442,262 B1 | 8/2002 | Moss et al. |
| 6,442,263 B1 | 8/2002 | Beaton et al. |
| 6,445,781 B1 | 9/2002 | Heinmiller et al. |
| 6,449,351 B1 | 9/2002 | Moss et al. |
| 6,449,361 B1 | 9/2002 | Okuda |
| 6,462,646 B2 | 10/2002 | Helferich |
| 6,466,653 B1 | 10/2002 | Hamrick et al. |
| 6,477,246 B1 | 11/2002 | Dolan et al. |
| 6,480,589 B1 | 11/2002 | Lee et al. |
| 6,483,898 B2 | 11/2002 | Lew et al. |
| 6,493,430 B2 | 12/2002 | Leuca et al. |
| 6,493,431 B1 | 12/2002 | Troen-Krasnow et al. |
| 6,493,437 B1 | 12/2002 | Olshansky |
| 6,493,439 B2 | 12/2002 | Lung et al. |
| 6,494,953 B2 | 12/2002 | Hayes et al. |
| 6,496,569 B2 | 12/2002 | Pelletier et al. |
| 6,496,571 B1 | 12/2002 | Wilson |
| 6,496,692 B1 | 12/2002 | Shanahan |
| 6,498,841 B2 | 12/2002 | Bull et al. |
| 6,507,737 B1 | 1/2003 | Laham et al. |
| 6,529,500 B1 | 3/2003 | Pandharipande |
| 6,529,591 B1 | 3/2003 | Dosani et al. |
| 6,532,490 B1 | 3/2003 | Lewis et al. |
| 6,539,080 B1 | 3/2003 | Bruce et al. |
| 6,542,583 B1 | 4/2003 | Taylor |
| 6,542,586 B1 | 4/2003 | Helstab |
| 6,542,591 B1 | 4/2003 | Amro et al. |
| 6,542,602 B1 | 4/2003 | Elazar |
| 6,542,812 B1 | 4/2003 | Obradovich et al. |
| 6,546,092 B2 | 4/2003 | Corbett et al. |
| 6,549,621 B1 | 4/2003 | Christie, IV et al. |
| 6,553,110 B1 | 4/2003 | Peng |
| 6,553,221 B2 | 4/2003 | Nakamura |
| 6,556,540 B1 | 4/2003 | Mawhinney et al. |
| 6,560,317 B1 | 5/2003 | Quagliana |
| 6,560,327 B1 | 5/2003 | McConnell |
| 6,566,995 B2 | 5/2003 | Furuuchi et al. |
| 6,570,971 B2 | 5/2003 | Latter et al. |
| 6,570,974 B1 | 5/2003 | Gerzberg et al. |
| 6,574,319 B2 | 6/2003 | Latter et al. |
| 6,584,490 B1 | 6/2003 | Schuster et al. |
| 6,587,458 B1 | 7/2003 | Burg et al. |
| 6,597,905 B1 | 7/2003 | Hijii |
| 6,603,840 B2 | 8/2003 | Fellingham et al. |
| 6,608,891 B1 | 8/2003 | Pelletier et al. |
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |

| Patent | Date | Inventor |
|---|---|---|
| 6,661,785 B1 | 12/2003 | Zhang et al. |
| 6,665,388 B2 | 12/2003 | Bedingfield |
| 6,683,870 B1 | 1/2004 | Archer |
| 6,687,341 B1 | 2/2004 | Koch et al. |
| 6,697,357 B2 | 2/2004 | Emerson et al. |
| 6,701,160 B1 | 3/2004 | Pinder et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B2 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,738,615 B2 | 5/2004 | Chow et al. |
| 6,748,058 B1 | 6/2004 | Schwend et al. |
| 6,748,068 B1 | 6/2004 | Walsh et al. |
| 6,751,457 B1 | 6/2004 | Martin |
| 6,757,274 B1 | 6/2004 | Bedingfield et al. |
| 6,757,740 B1 | 6/2004 | Parekh et al. |
| 6,760,413 B2 | 7/2004 | Cannon et al. |
| 6,765,998 B2 | 7/2004 | Bruce et al. |
| 6,766,003 B2 | 7/2004 | Moss et al. |
| 6,768,792 B2 | 7/2004 | Brown et al. |
| D494,953 S | 8/2004 | Leung |
| 6,771,754 B2 | 8/2004 | Pelletier et al. |
| 6,771,755 B1 | 8/2004 | Simpson |
| 6,771,956 B1 | 8/2004 | Beeler |
| 6,775,366 B1 | 8/2004 | Cobbett et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 * | 8/2004 | Chapman et al. ............ 370/522 |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B2 | 9/2004 | Hansen |
| 6,798,879 B1 | 9/2004 | Beham |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,826,271 B1 | 11/2004 | Kanabar et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Peshan |
| 6,868,155 B1 | 3/2005 | Cannon et al. |
| 6,871,076 B2 | 3/2005 | Samn |
| 6,888,927 B1 | 5/2005 | Cruickshank et al. |
| 6,898,275 B2 | 5/2005 | Dolan et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones |
| 6,952,469 B2 | 10/2005 | Han |
| 6,977,993 B2 | 12/2005 | Starbuck et al. |
| 6,996,211 B2 | 2/2006 | Reynolds et al. |
| 7,016,482 B2 | 3/2006 | Moss et al. |
| 7,097,169 B2 | 8/2006 | Mueller |
| 7,103,167 B2 | 9/2006 | Brahm et al. |
| 7,103,662 B2 | 9/2006 | Ray et al. |
| 7,127,488 B1 | 10/2006 | Scott et al. |
| 7,129,374 B2 | 10/2006 | Weissbach et al. |
| 7,155,211 B2 | 12/2006 | Mun et al. |
| 2001/0005854 A1 | 6/2001 | Murata et al. |
| 2001/0044989 A1 | 11/2001 | Benussi et al. |
| 2002/0004382 A1 | 1/2002 | Cox et al. |
| 2002/0009184 A1 | 1/2002 | Shnier |
| 2002/0016748 A1 | 2/2002 | Emodi |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0090933 A1 | 7/2002 | Rouse et al. |
| 2002/0094826 A1 | 7/2002 | Lee |
| 2002/0118812 A1 | 8/2002 | Contractor |
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0183098 A1 | 12/2002 | Lee |
| 2002/0188443 A1 | 12/2002 | Reddy et al. |
| 2002/0191755 A1 | 12/2002 | Lew |
| 2002/0196913 A1 | 12/2002 | Ruckart |
| 2002/0196914 A1 | 12/2002 | Ruckart |
| 2003/0007620 A1 | 1/2003 | Elsey |
| 2003/0012147 A1 | 1/2003 | Buckman et al. |
| 2003/0012353 A1 | 1/2003 | Tang |
| 2003/0016800 A1 | 1/2003 | Fukuda |
| 2003/0026413 A1 | 2/2003 | Brandt et al. |
| 2003/0026416 A1 | 2/2003 | Fusco |
| 2003/0032414 A1 | 2/2003 | Melaku |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0092384 A1 | 5/2003 | Ross, III |
| 2003/0095650 A1 | 5/2003 | Mize |
| 2003/0108184 A1 | 6/2003 | Brown et al. |
| 2003/0112938 A1 | 6/2003 | Kanakubo et al. |
| 2003/0119503 A1 | 6/2003 | Shohara et al. |
| 2003/0133553 A1 | 7/2003 | Khakoo |
| 2003/0133653 A1 | 7/2003 | Barros et al. |
| 2003/0148758 A1 | 8/2003 | McMullin |
| 2003/0152207 A1 | 8/2003 | Ryan |
| 2003/0172183 A1 | 9/2003 | Anderson et al. |
| 2003/0187949 A1 | 10/2003 | Bhatt |
| 2003/0196206 A1 | 10/2003 | Shusman |
| 2003/0198322 A1 | 10/2003 | White, Jr. |
| 2003/0219107 A1 | 11/2003 | Richardson |
| 2004/0049545 A1 | 3/2004 | Lockridge et al. |
| 2004/0101118 A1 | 5/2004 | Powell |
| 2004/0101124 A1 | 5/2004 | Koch et al. |
| 2004/0109558 A1 | 6/2004 | Koch |
| 2004/0114730 A1 | 6/2004 | Koch et al. |
| 2004/0120475 A1 | 6/2004 | Bauer et al. |
| 2004/0125929 A1 | 7/2004 | Pope |
| 2004/0171370 A1 | 9/2004 | Natarajan |
| 2004/0181587 A1 | 9/2004 | Cao et al. |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0213207 A1 | 10/2004 | Silver et al. |
| 2004/0233892 A1 | 11/2004 | Roberts et al. |
| 2004/0242212 A1 | 12/2004 | Bacon et al. |
| 2004/0248560 A1 | 12/2004 | Bedingfield et al. |
| 2005/0073999 A1 | 4/2005 | Koch et al. |
| 2005/0084084 A1 | 4/2005 | Cook et al. |

| | | |
|---|---|---|
| 2005/0100158 A1 | 5/2005 | Kreiner et al. |
| 2005/0107074 A1 | 5/2005 | Zellner |
| 2005/0147228 A1 | 7/2005 | Perrella et al. |
| 2005/0152525 A1 | 7/2005 | Kent, Jr. et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0152207 A1 | 7/2006 | Riebel et al. |

FOREIGN PATENT DOCUMENTS

| | | |
|---|---|---|
| WO | 0 821 511 | 1/1998 |

OTHER PUBLICATIONS

"RBS 884 Pico System Description", Author Unknown, Ericsson 1/1551-AE/LZB 119 2269 Uae Rev A, Apr. 23, 1998.

Talking Caller ID, SMARTHOME, http://www.smarthome.com/5154.html Nov. 5, 2001.

Slawson, "Caller ID Basics" Caller ID, http://www.testmark.com/develop/tml_callerid_cnt.html, Oct. 31, 2001.

OKI Silicon Solutions Company, Japan Site, "Multi Lingual Test-to-Speech Processor ML2110." http://www.oki.com/semi/english/ml2110/html, Nov. 1, 2001.

Voice-6090 "Talking Caller ID", Aastra Telecom—Taking Caller ID—Voice 9090, http://www.aastra.com/products/callerids/voicecallerid/be-6060.html Nov. 5, 2001.

Voice-9090 "Talking Caller ID", Aastra Telecom—Talking Caller ID—Voice 9090, http://www.aastra.com/products/callerids/voicecallerid/be-9090.html Nov. 5, 2001.

"Talking Caller ID", Stealth Software, http://www.talkingcallerid.com/, Talking Caller ID—Featuring Talking, Paging, Email, Voice Mail, Blocking, Text-to-speech, Nov. 5, 2001.

"Address Allocation for Private Internets", Rekhter et al., Feb. 1996.

"SIP Session Initiation Protocol", Handley et al., Mar. 1999.

"The IP Network Address Translator (NAT)", Egevang et al., May 1994.

International Search Report, PCT/US02/29988, Sep. 23, 2002.

Bellcore Specification TR-NWT-000310, Calling Number Delivery, Issue 4, Dec. 1992.

Bellcore Specification TR-NWT-001188, Calling Name Delivery Generic Requirements, Issue 1, Dec. 1991.

Mark H. Norris, Transmitter Architectures, 1998, IEE, pp$^{4}/_{1}$; $^{4}/_{6}$.

J. Bosswell, G. Lingenauber, An Advanced HF Receiver Design, Jul. 1994, IEE, Conference Publication No. 392, pp. 41-47.

T. Farley et al.; "Cellular Telephone Basics: AMPS & Beyond;" [online]; [retrieved on Mar. 6, 2003]; retrieved from the Internaet http://www.privateline.com/Cellbasics.html.

"The alled ID System That Speaks for Itself!" [online]; [retrieved on Aug. 31, 2005]; retrieved from the Internet http://www.smarthome.com/5154.html.

"Time Division Multiple Access (TDMA);" [online]; [retrieved on Mar. 6, 2003]; retrieved from the Internet http://www.iec.org/online/tutorials/tdma/.

Partridge, H1714, Mar. 3, 1998.

\* cited by examiner

DYNAMIC CALLER ID MESSAGING

CROSS REFERENCE TO RELATED APPLICATIONS

This application relates to applicants' co-pending application Ser. No. 10/418,774 entitled "Caller ID Messaging Device," filed simultaneously herewith and of which the "Brief Summary of the Invention" and "Detailed Description of the Invention" sections are incorporated herein by this reference.

This application relates to applicants' co-pending application Ser. No. 10/418,773 entitled "Caller ID Messaging Telecommunications Services," filed simultaneously herewith and of which the "Brief Summary of the Invention" and "Detailed Description of the Invention" sections are incorporated herein by this reference.

This application relates to applicants' co-pending application Ser. No. 10/418,878 entitled "Caller ID Messaging," filed simultaneously herewith and of which the "Brief Summary of the Invention" and "Detailed Description of the Invention" sections are incorporated herein by this reference.

This application relates to applicants' co-pending application Ser. No. 10/418,775 entitled "Private Caller ID Messaging," filed simultaneously herewith and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention relates to a system and method for caller identification messaging.

2. Description of the Related Art

Telecommunications has experienced explosive growth, and more growth is planned as telecommunication access and numerous communications devices improve. This explosive growth is revolutionizing special services offered to subscribing customers. Of the special service offerings, the most relevant to this invention is the caller identification or Caller ID services. A customer or a user of a telephone that is served by the Caller ID service is provided with a calling party's directory information. Presently available Caller ID systems provide the calling party's telephone number and a billing name associated with the calling party's telephone number (if available) when an incoming caller line identification (ICLID) signal can be detected, decoded, and transmitted to the called telephone or other display device associated with the called telephone (e.g., a Caller ID device). The Caller ID services also allow a receiving party to receive directory information for other incoming calls while the receiving party's phone is used (e.g., during a conversation with another party); this service is sometimes referred to as Caller ID Call Waiting service.

A customer may use the displayed Caller ID information to make a decision whether to answer and/or to prepare for the call. Thereafter, the customer has a record of the Caller ID information and may use that information to return a call or to track incoming calls. A problem arises when the customer cannot recognize the Caller ID information. For example, if a calling party uses a pay phone to place the incoming call, then the Caller ID information displays the number associated with the pay phone. If the customer does not recognize the pay phone number, the customer, then, cannot associate the number with the calling party. Other problems exist with limited information transmitted with the ICLID signal and with limited capabilities of Caller ID devices. In recent years, telephony providers and manufacturers have tried to provide alternate caller identification systems and methods.

For example, U.S. Pat. No. 5,784,444, entitled "Method and Apparatus for Providing Personal Calling Identification at Remote Locations," discloses a method for a caller to provide an alternate telephone number to be used instead of the telephone number of the calling station as the ICLID number. Further, the '444 patent discloses an apparatus that displays both the alternate telephone number and the telephone number of the calling station and that also displays a textual message along with both telephone numbers. Another example is U.S. Pat. No. 6,192,116 B1, entitled "System and Method for Generating CID/CIDW Information with a User Inputted Message," that discloses a method and system for sending the CID/CIDW information along with an alphanumeric message to a second phone. Both the '444 and '116 patents, however, have several drawbacks that include necessitating specialized peripheral hardware and equipment, limiting the textual message and alphanumeric message for visual presentation by the specialized peripheral hardware and equipment, and limiting transmission of the textual message and the alphanumeric message to the called phone.

BRIEF SUMMARY OF THE INVENTION

This invention addresses the above and other needs by providing systems and methods for enabling and/or generating Caller ID messaging. Typically, a calling party uses a Caller ID Messaging Device that supplants the incoming calling line identification (ICLID) signal with a Caller ID Messaging Signal and transmits the Caller ID Messaging Signal to a destination communications address. The Caller ID Messaging Signal includes a personalized message and may also include an identifier of the calling party (e.g., name, address of calling party's communications device, such as an originating telephone number, etc.), an identifier of the destination communications address (e.g., name of called party, address of the called party's communications device, such as the destination telephone number, etc.), and/or an identifier of the calling party's communications device (e.g., POTS phone, cellular phone, personal digital assistant, etc.). Alternatively, the calling party may use a conventional telephone to access a communications network, activate Caller ID messaging services, compose or retrieve a stored Caller ID Message, and transmit the Caller ID Messaging Signal to the destination communications address. The Caller ID Message may include text, video, voice, and/or digital data. After the Caller ID Messaging Signal is transmitted to the destination communications address, a receiving party (e.g., called party) may act on the caller identification messaging signal. For example, the receiving party may review the Caller ID Message signal, respond with a response Caller ID Message, forward the Caller ID Messaging Signal, store the Caller ID Messaging Signal, ignore the Caller ID Messaging Signal, and other handling options. Additionally, a telecommunications customer may subscribe to a Caller ID Messaging Blocking service to decline Caller ID Messaging (similar to Privacy Director).

In an embodiment, a Caller ID messaging communications system includes a communications link over a communications network that allows communications devices of a calling party, a receiving party, and/or a third party to transmit and receive communications signals. The Caller ID messaging communications system also includes a caller identification messaging device that communicates a caller identification messaging signal over the communications link of the communications network. The caller identification messaging signal includes a caller identification message and further includes an identifier of the calling party, a communications address of the calling party's communications device, an identifier of the receiving party, a communications address of the receiving party's communications device, an identifier of the third party, and/or an identifier of the third party's communications device. The communications network communicates the caller identification message and/or the caller identification messaging signal to one or more communications addresses of the calling party's communications device, the receiving party's communications device, and the third party's communications device during the communications link. The communications network may include a public switched telephone network (PSTN), a mobile switching telephone communications network (MSTO), a world wide electronic data communications network (e.g., Intranet, Internet, and Extranet), satellite communications network, and/or other networks.

In another embodiment, a method for caller identification messaging includes establishing a communications link in a communications network, receiving a caller identification messaging signal from an intelligent communications switch in the communications network, using the caller identification messaging signal to determine routing of the caller identification messaging signal to a destinations communications address, and processing the caller identification messaging signal to the destinations communications address. The communications link includes communications between at least two of a calling party's communications device, a receiving party's communications device, and a third party's communications device. Similar to the above described system, the caller identification messaging signal includes a caller identification message and further includes an identifier of the calling party, a communications address of the calling party's communications device, an identifier of the receiving party, a communications address of the receiving party's communications device, an identifier of the third party, and/or an identifier of the third party's communications device. According to this embodiment, the destination communications addresses is the communications address of calling party's communications device, the receiving party's communications device, and/or the third party's communications device.

In another embodiment, a caller identification messaging communications system includes (1) an intelligent communications switch in a communications network for detecting an incoming communications signal on a communications link from a calling party's communications device to a third party's caller identification messaging access address, (2) a caller identification messaging application in the communications network for communicating with the calling party's communications device and with a caller identification messaging dataserver to generate a caller identification message and/or a caller identification messaging signal, and (3) the caller identification messaging dataserver in the communications network for storing a caller identification messaging profile. Similar to the above embodiments, the caller identification messaging signal includes a caller identification message and further includes an identifier of the calling party, a communications address of the calling party's communications device, an identifier of the receiving party, a communications address of the receiving party's communications device, an identifier of the third party, and/or an identifier of the third party's communications device. With regards to the caller identification messaging profile, the profile includes stored data associated with the caller identification message, the identifier of the calling party, the communications address of the calling party's communications device, caller identification messaging services associated with at least one of the calling party and the communications address the calling party, the identifier of the receiving party, the communications address of the receiving party's communications device, caller identification messaging services associated with at least one of the receiving party and the communications address of the receiving party, the identifier of the third party, the identifier of the communications address of the third party, caller identification messaging services associated with at least one of the receiving party and the communications address of the receiving party, and/or caller identification messaging default service parameters.

Further details on these embodiments and other possible embodiments of this invention are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
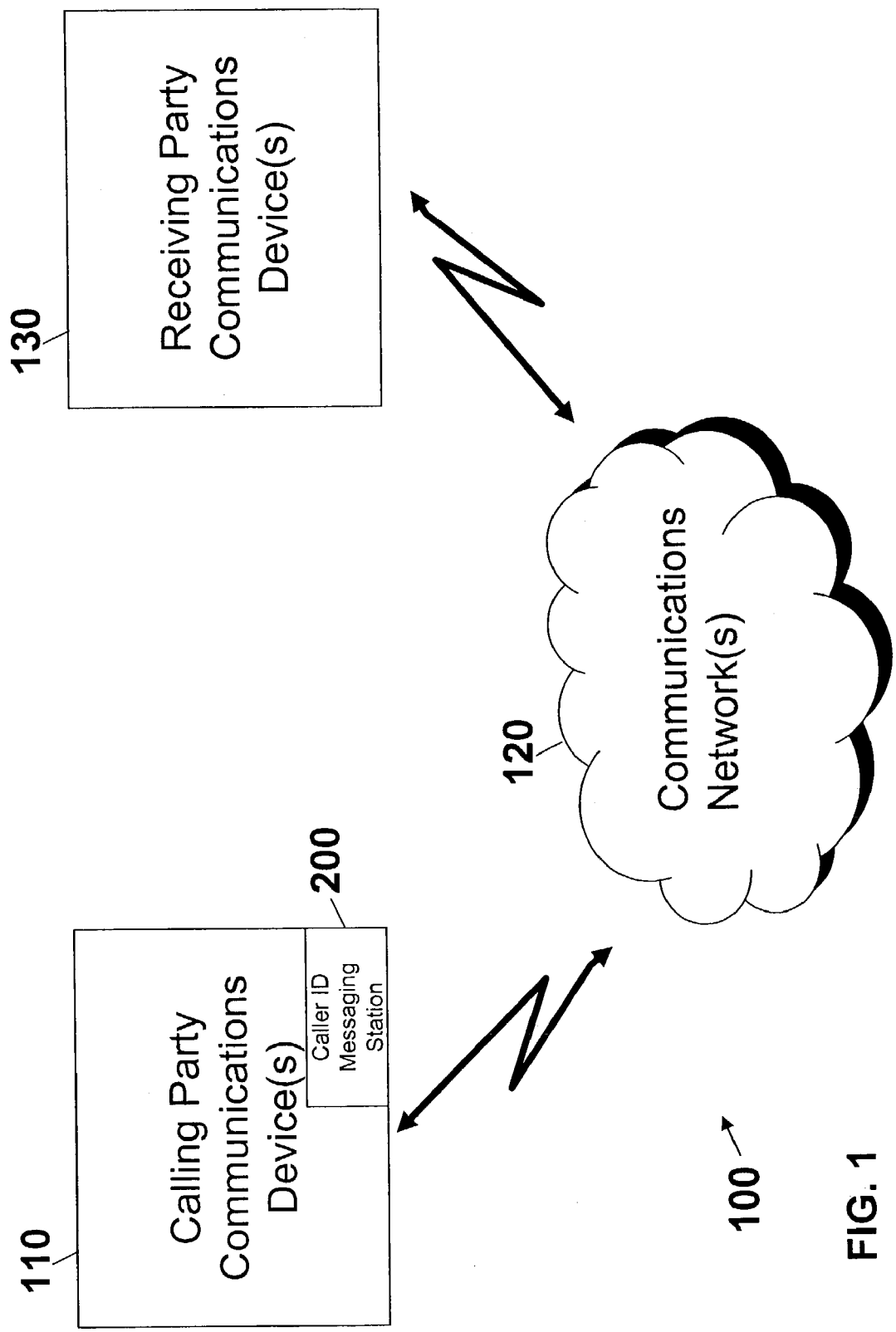
FIG. 1 is a schematic of a Caller ID messaging communications system illustrating a communications network connecting a calling party's communications device with a Caller ID Messaging Device and a receiving party's communications device according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The Caller ID messaging systems and methods of this invention operate with different communications devices and communications networks to generate, enable, and/or transmit a Caller ID Message. Typically, a public switched telecommunications network (PSTN) automates configuration and routing of a Caller ID Messaging Signal that includes the Caller ID Message and may also include an identifier of a calling party, an identifier of a destinations communications address (typically associated with a receiving party's communications device), and an identifier of an originating communications address (typically associated with a calling party's communications device). The Caller ID Messaging Signal may be generated by a Caller ID Messaging Device and/or by interactions with the PSTN (or, alternatively other communications networks) and the calling party's communications device. Some advantages of Caller ID messaging include the ability to use a conventional POTS phone with a connected communications network to generate a Caller ID Message, the ability of the communications network to transmit a Caller ID Message to a conventional Caller ID device (so that specialized hardware and equipment is not necessitated), the ability of the communications network to identify the receiving party's communications device to format the Caller ID Message for presentation by the receiving party's communications device, the ability to use a Caller ID Messaging Device to generate, respond to, forward, and/or otherwise manage Caller ID Messages (including other information that may be transmitted with the Caller ID Messaging Signal), the ability to transmit the Caller ID Message to numerous communications devices associated with a receiving party, and the ability to identify whether the receiving party blocks or does not accept Caller ID Messaging Signals and, if so, notify the calling party of the Caller ID Message delivery failure.

As used herein, the term "communications device" includes wired and wireless communications devices, such as a mobile phone, a wireless phone, a WAP phone, a satellite phone, a computer, a modem, a pager, a digital music device, a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with the receiving party, and/or (4) profiles associated with the Caller ID Messaging Signal, including configuration, authenticity, security, and others. Still further, the term "processing," as used herein, encompasses every event from the time the calling party communications device goes off-hook to the termination of the communications signal (e.g., hanging up the telephone call). "Processing" of the communications signal includes routing a voice path and signaling setup and intelligence (e.g., Local Number Portability queries, queries to retrieve Calling Name/Number information, intelligence queries by the AIN components, and standard signaling messages to determine communications routing paths). The term "processing" also includes monitoring an established communications link for possible entry of a caller identification messaging signal, switch hook flash, other events that indicate a party on the telephone call has requested an action, and delivery of at least one of the caller message and the caller identification messaging signal. Finally, in various embodiments, the data (e.g., caller identification messaging signal data) may be stored by the communications network, a peripheral storage device connected to the communications network, the Caller ID Messaging Device, and/or other connected networks.

Referring now to the figures, FIG. 1 illustrates a Caller ID messaging communications system 100 including a calling party's communications device 110 having (or coupled with) a Caller ID Messaging Device 200, at least one communications network 120, and a receiving party's communications device 130. A calling party composes, retrieves, and/or otherwise generates a Caller ID Message using his/her communications device 110 and/or the Caller ID Messaging Device 200 which transmits a Caller ID Messaging Signal with the Caller ID Message, an identifier of a calling party (e.g., name, workstation, name of employer, phone number, etc.), an identifier of a destinations communications address (e.g., receiving party's telephone number, receiving party's IP address, etc.), and/or an identifier of the calling party's communications device (e.g., cellular phone, personal digital assistant, etc.) to the communications network 120. Typically, the communications network 120 detects and decodes the incoming Caller ID Messaging Signal, compares the incoming Caller ID Messaging Signal with Caller ID messaging data stored in one or more databases of the communications network to determine one or more destination communications addresses of the receiving party, whether the destination communications address(es) accepts Caller ID Messaging Signals, and/or presentation capabilities of the receiving party's communications device 130 associated with each destination communications address.

Figure 2:
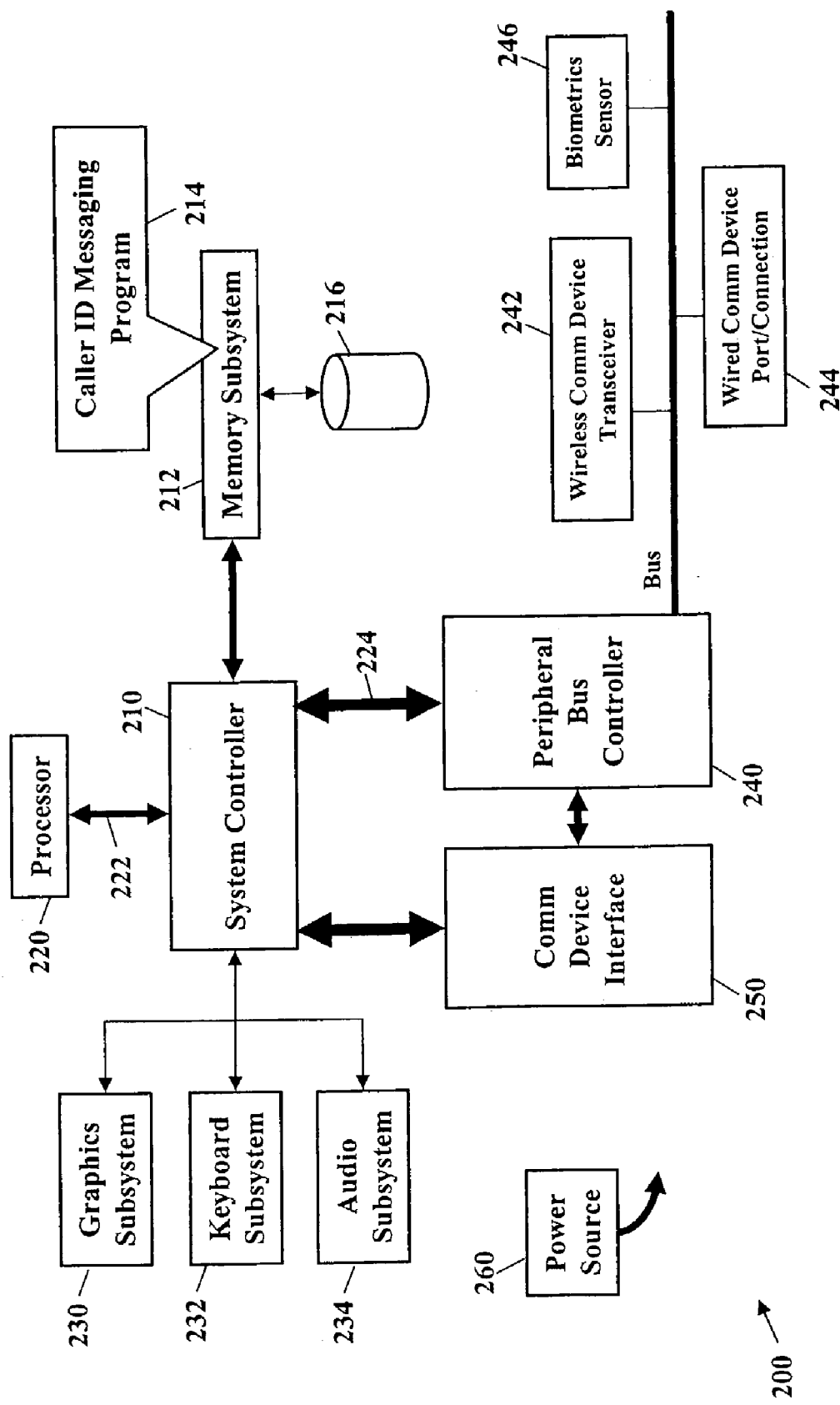
FIG. 2 is a block diagram of a Caller ID Messaging Device according to an embodiment of this invention.

FIG. 2 is a block diagram showing the Caller ID Messaging Device 200 according to an embodiment of this invention. The Caller ID Messaging Device 200 includes a Caller ID Messaging Program 214 that operates within a system memory device 212. The Caller ID Messaging Program 214, however, could also reside in flash memory or a peripheral storage device 216. The Caller ID Messaging Device 200 also has one or more central processors 220 executing an operating system. The operating system, as is well known, has a set of instructions that control the internal functions of the Caller ID Messaging Device 200. A system bus 222 communicates signals, such as data signals, control signals, and address signals, between the central processor(s) 220 and a system controller 210. The system controller 210 provides a bridging function between the memory subsystem 212, the one or more central processors 220, a graphics subsystem 230, a keyboard subsystem 232, an audio subsystem 234, a PCI (Peripheral Controller Interface) bus 224, and a Communications ("Comm") Device Interface 250. The PCI bus 224 is controlled by a Peripheral Bus Controller 240. The Peripheral Bus Controller 240 is an integrated circuit that serves as an input/output hub for various peripheral ports and/or transceivers. These peripheral ports allow the Caller ID Messaging Device 200 to communicate with a variety of communications devices through networking ports (such as SCSI or Ethernet) that include Wireless Communications ("Comm") Device Transceiver 242 (such as Wireless 802.11 and Infrared) and Wired Communications ("Comm") Device Port/Connection 244 (such as modem V90+ and compact flash slots). These peripheral ports could also include other networking ports, such as, a serial port (not shown) and/or a parallel port (not shown). The Comm Device Interface 250 allows the Caller ID Messaging Device 200 to monitor, detect, receive, and decode incoming communications signals to the communications device(s) connected to the Wireless Comm Device Transceiver 242 and/or the Wired Comm Device Port/Connection 246. Further, the Comm Device Interface 250 transmits the outgoing Caller ID Messaging Signal to the Wireless Comm Device Transceiver 242 and/or the Wired Comm Device Port/Connection 246. Still further, the Caller ID Messaging Device 200 may include a power source 260, such as a rechargeable battery to provide power and allow the Caller ID Messaging Device 200 to be portable. In alternate embodiments, the Caller ID Messaging Device 200 could include its own telephone line (or other communications connection) to the communications network 120 (not shown). Another alternative may include the Caller ID Messaging Device 200 incorporated into a specially designed communications device (not shown).

The system memory device (shown as memory subsystem 212 or peripheral storage device 216) may also contain one or more application programs. For example, an application program may cooperate with the operating system and with a video display unit (via graphics subsystem 230) to provide a GUI for the Caller ID Messaging Program 214. The GUI typically includes a combination of signals communicating with the graphics subsystem 230 and/or the keyboard subsystem 232. The GUI provides a convenient visual and/or audible interface with the user of the Caller ID Messaging Device 200. As is apparent to those of ordinary skill in the art, the user (e.g., calling party) interacts with the Caller ID Messaging Program over a variety of mediums, such as, for example, a stylus, keyboard, and punch buttons of the keyboard subsystem 232, a display screen of the graphics subsystem 230, and/or a voice-activated menu prompt of the audio subsystem 234. Additionally, the peripheral bus controller 240 provides an interface with a biometrics sensor 246, such as, for example, a fingerprint ID device. The biometrics sensor 246 may provide security features that prevent unauthorized users from exploiting the Caller ID Messaging Device 200. The biometrics sensor 246 could also comprise retina recognition device and software, DNA/

RNA recognition device and software, facial recognition device and software, speech recognition device and software, and/or scent recognition device and software.

Figure 3:
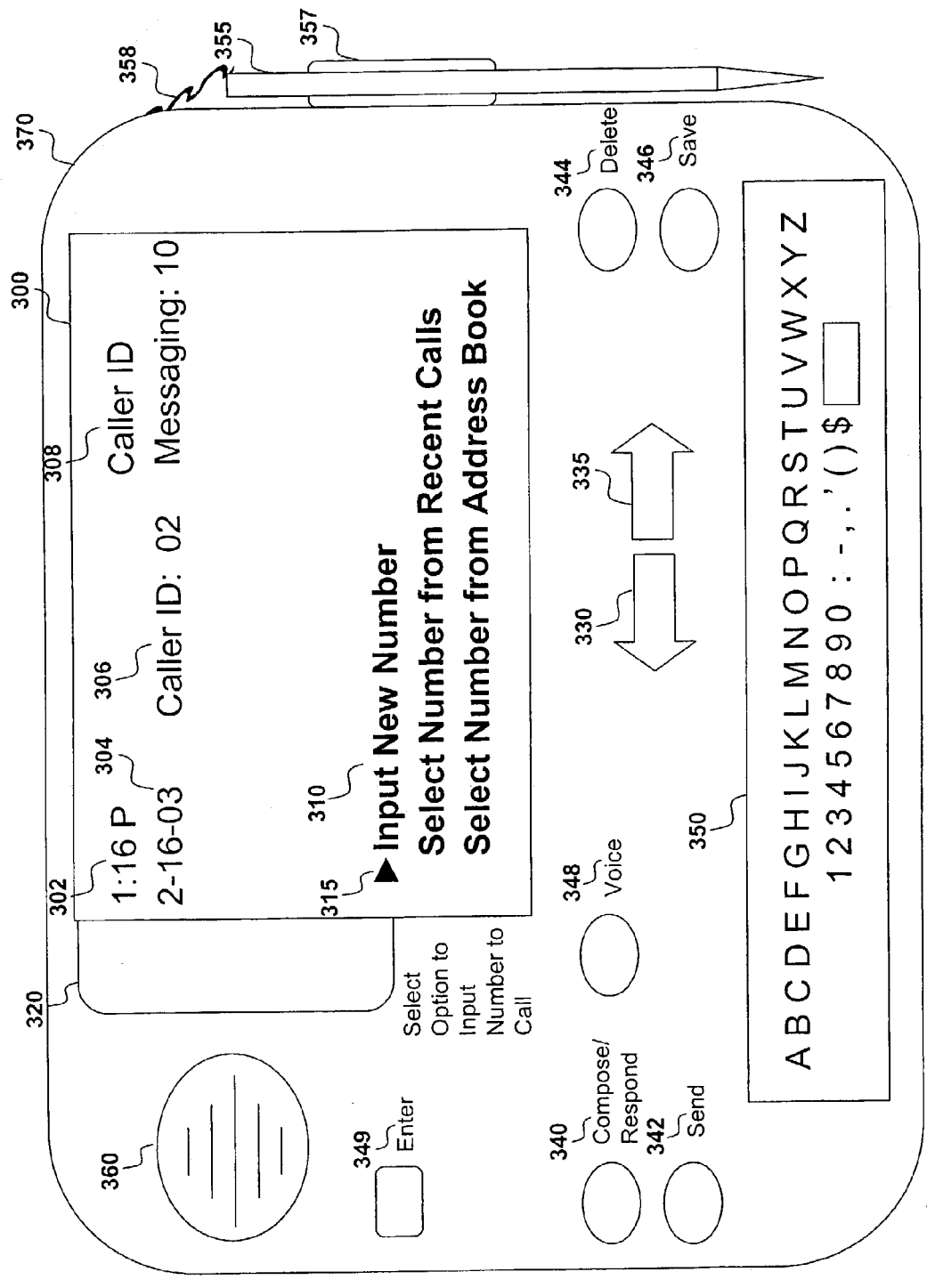
FIGS. 3–4 are perspective front views of the Caller ID Messaging Device of FIG. 2 including screen displays for inputting a destination communications address and a Caller ID Message according to embodiments of this invention.
Figure 4:
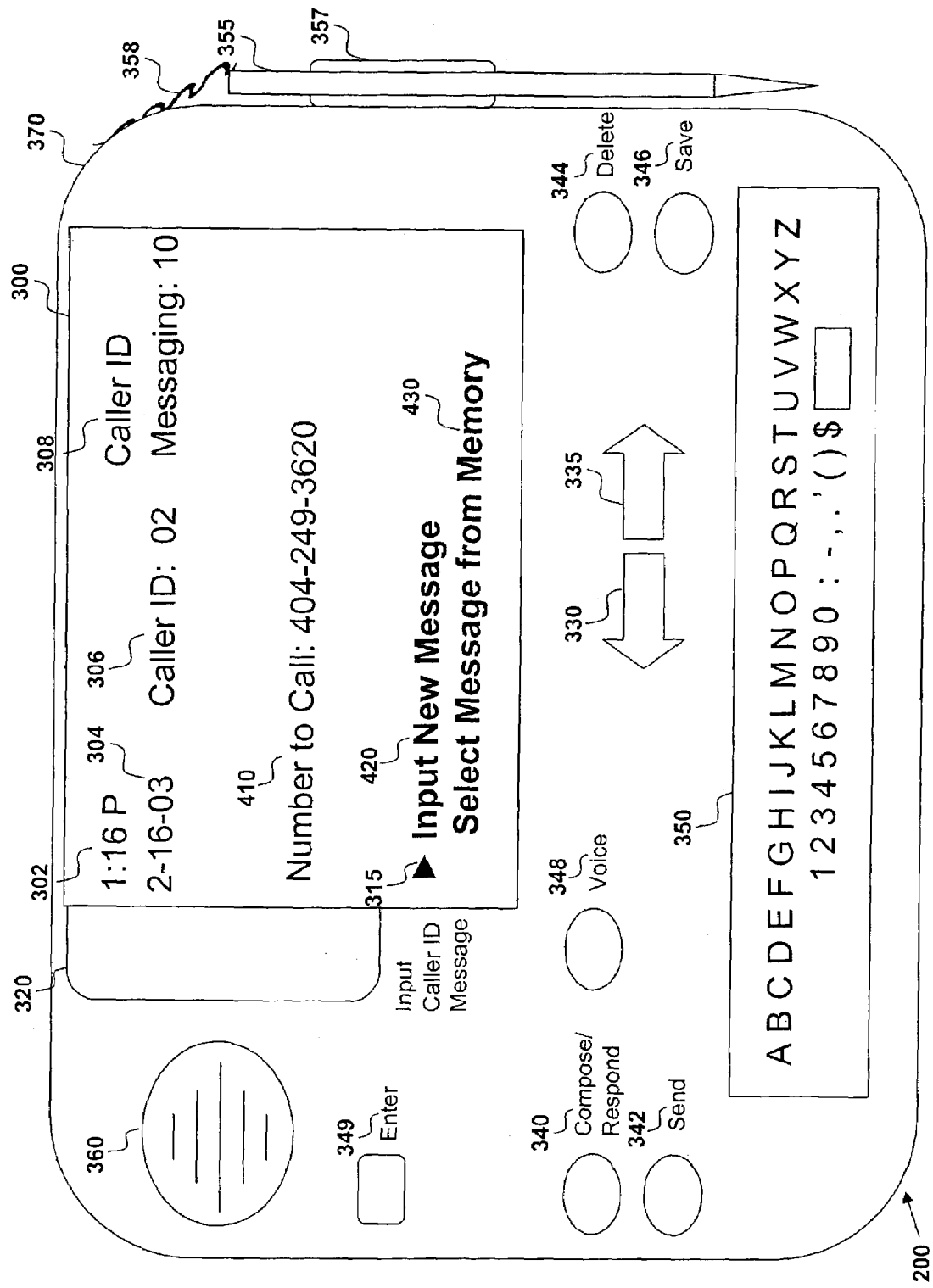

Referring now to FIGS. 3-4 in conjunction with FIG. 2, the graphics subsystem 230 includes a display screen 300 having displays for a time 302, a date 304, a numeric identifier 306 of an incoming Caller ID Message (transmitting ICLID signal), a numeric identifier 308 of an outgoing (or an incoming) Caller ID Messaging Signal, and a graphical user interface 310 for selecting and/or inputting a destinations communications address of the Caller ID Messaging Signal. The Caller ID Messaging Device 200 also includes a lighted display panel 320 that flashes to produce a visual alert of incoming and/or outgoing Caller ID Messaging Signals and/or incoming ICLID (e.g., Caller ID) signals. The lighted display panel 320 may be part of graphics subsystem 230 or may be an isolated component. The keyboard subsystem 232 includes punch buttons 330, 335, 340, 342, 344, 346, and 348, keyboard 350, and stylus 355. The stylus 355 is connected by a cord 356 or other appropriate connection assembly (not shown) to a housing 370 of the Caller Id Messaging device 200 and positioned in a storage holder 357 when not in use. The stylus 355 may be used to interact with the keyboard 350 and/or with the display 300 to input Caller ID messaging data (e.g., destinations communications address, Caller ID Message, etc.). Alternatively, the user could use his/her fingers or other pointed device to select each character from the keyboard 350 and/or to sketch something onto the display 300 (such as a doodle to transmit with the Caller ID Message signal). With regards to the punch buttons, they provide a convenient interface for quickly interacting with the Caller ID Messaging Device 200. For example, the user may punch or press (1) a left arrow key 330 to scroll backwards through Caller ID Messages, go back a step when interacting with the Caller ID Messaging Program 214, and/or for other interactions with the Caller ID Messaging Program 214, (2) a right arrow key 335 to scroll forwards through Caller ID Messages and for other interactions with the Caller ID Messaging Program 214, (3) a "Compose/Respond" button 340 to initiate composing or responding to a Caller ID Messaging Signal, (4) a "Send" button 342 to send or otherwise transmit the Caller ID Messaging Signal, (5) a "Delete" button 344 to erase Caller ID Messages, (6) a "Save" 346 button to store Caller ID Messages, (7) a "Voice" button 348 to record a voice or other audio message (in different embodiments, the audio message may be converted from a speech-to-text message for the outgoing Caller ID Messaging Signal and/or the audio message may be transmitted as the Caller ID Message) and/or to convert a text Caller ID Message from text-to-speech (such as with visually impaired customers), and (8) an "Enter" button 349 to enter and/or confirm selection of information displayed on the display screen 300. Further, the "Voice" button 348 interfaces with a speaker/recorder 360 of the audio subsystem 234 to audibly present and/or record data of the Caller ID Messaging Signal and to interact with the Caller ID Messaging Program 214 to administer and otherwise manage the Caller ID Messaging Device 200.

Typically, the calling party composes a Caller ID Messaging Signal by punching or pressing the "Compose/Respond" button 340 that brings up an interactive destinations communications addressing GUI 310. The user may select to (1) input a new address (e.g., telephone number), (2) select an address from recent calls (including outgoing and incoming), and (3) select an address from an address book (created by Caller ID Messaging Program 214). After the destination communications address(es) is selected, the address is displayed at a "Number to Call" portion 410 of the display screen 300. Alternatively, the address may be displayed as "Name of Receiving Party to Contact," "Communications Address to Contact," and so on, such that the destinations communications address may be associated with the receiving party and/or with communications devices using non-North American Numbering Plan (NANP) addressing schemes. After the destinations communications address is input, the calling party presses the "Enter" button 349 to enter the communications address and to bring up a Caller ID Message GUI 420 that allows the calling party to select whether to (1) input a new Caller ID Message or (2) select a Caller ID Message from memory. For example, if the user uses the right arrow 335 (or left arrow 330) to move pointer 440 on "Input A New Message" and then presses the "Enter" button 349, an Input Message GUI (not shown) is displayed and the user may use the keyboard subsystem 232, graphics subsystem 230, and/or audio subsystem 234 to enter the Caller ID Message. Should the user wish to erase or modify the Caller ID Message, the user may use the left arrow button 330 to back up and re-enter the Caller ID Message. Thereafter, the user punches or presses the "Send" button 342, and the Caller ID Messaging Program 214 uses the input information to generate the Caller ID Messaging Signal and transmits it to the Comm Device Interface 250. If, however, the calling party uses the right arrow 335 to move the pointer 440 on "Select A Message From Memory" and then presses "Enter" button 349, a Select Message GUI (not shown) is displayed with a menu for navigating stored Caller ID Messages (such as, for example, doodles drawn by a user, Caller ID Messages associated with the calling party or receiving party, an alphabetical or numeric listing of Caller ID Messages, search options for finding a stored Caller ID Message, frequently sent Caller ID Messages, and so on) and the calling party selects the Caller ID Message and presses the "Send" button 342 to generate the Caller ID Message and transmit it to the Comm Device Interface 250. The stored Caller ID Messages may be stored by local memory device 216, or by a peripheral storage device (such as Caller ID Messaging DataServer 718 shown in FIG. 7). The Comm Device Interface 250 initiates communications with the communications network 120 and transmits the Caller ID Messaging Signal. In an alternate embodiment, the Comm Device Interface 250 may format the Caller ID Messaging Signal for a connected or integrated communications device (via the Wireless Comm Device Transceiver 242 and/or Wired Comm Device Port/Connection 244), and, the connected or integrated communications device would then initiate communications with the communications network 120 and transmit the Caller ID Messaging Signal (via the connected or integrated communications device). Still, in another alternated embodiment, the Comm Device Interface may include intelligent componentry that detects or otherwise identifies the receiving party's communications device 130 and formats or otherwise configures the Caller ID Messaging Signal for presentation by the receiving party's communications device 130 (e.g., if the Caller ID Message is audio data, but the receiving party's communications device 130 does not present and/or accept audio data, then the audio data is converted to text).

Figure 5:
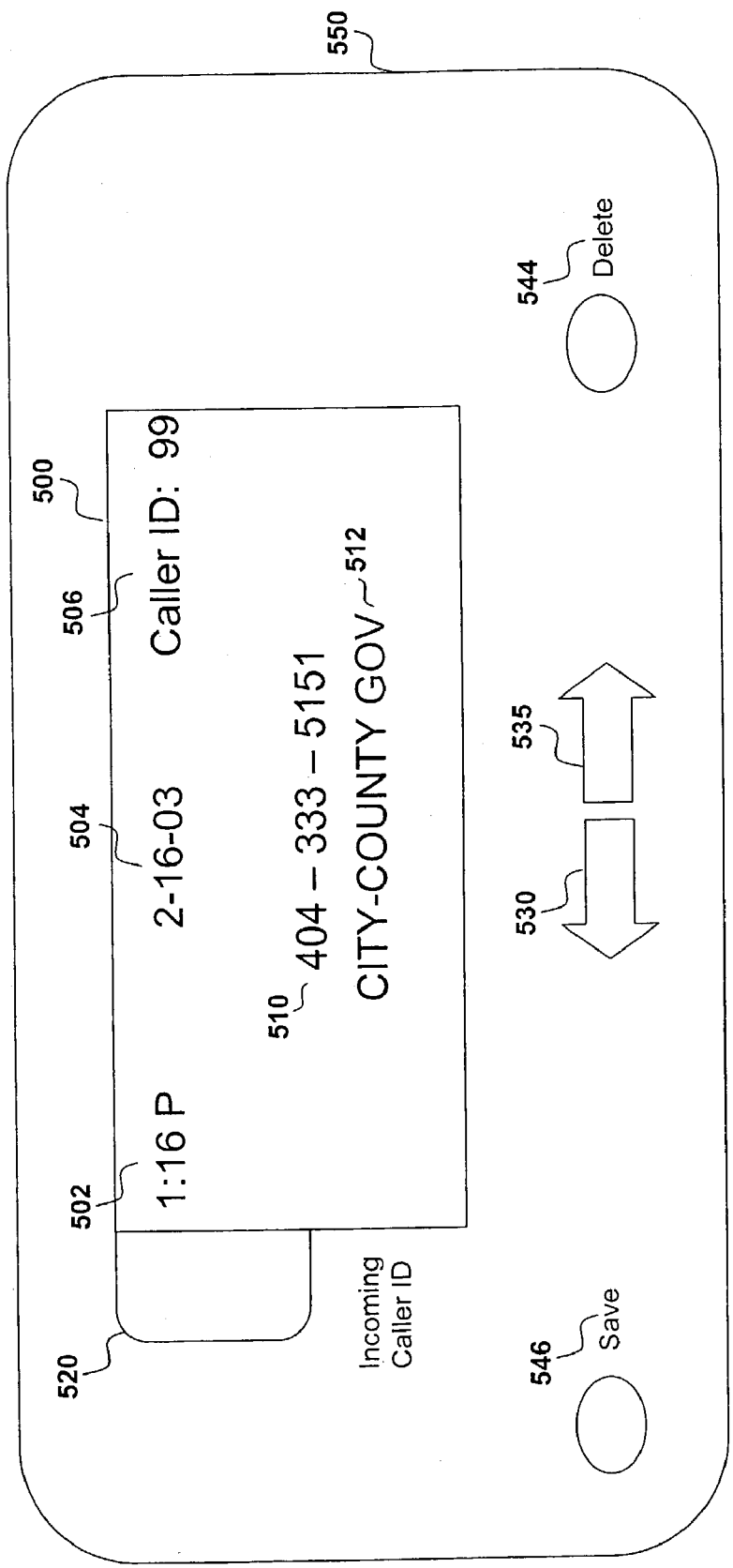
FIG. 5 is a perspective front view of a conventional Caller ID Device (labeled "PRIOR ART") illustrating the screen display presenting an incoming line identification (ICLID) signal.
Figure 6:
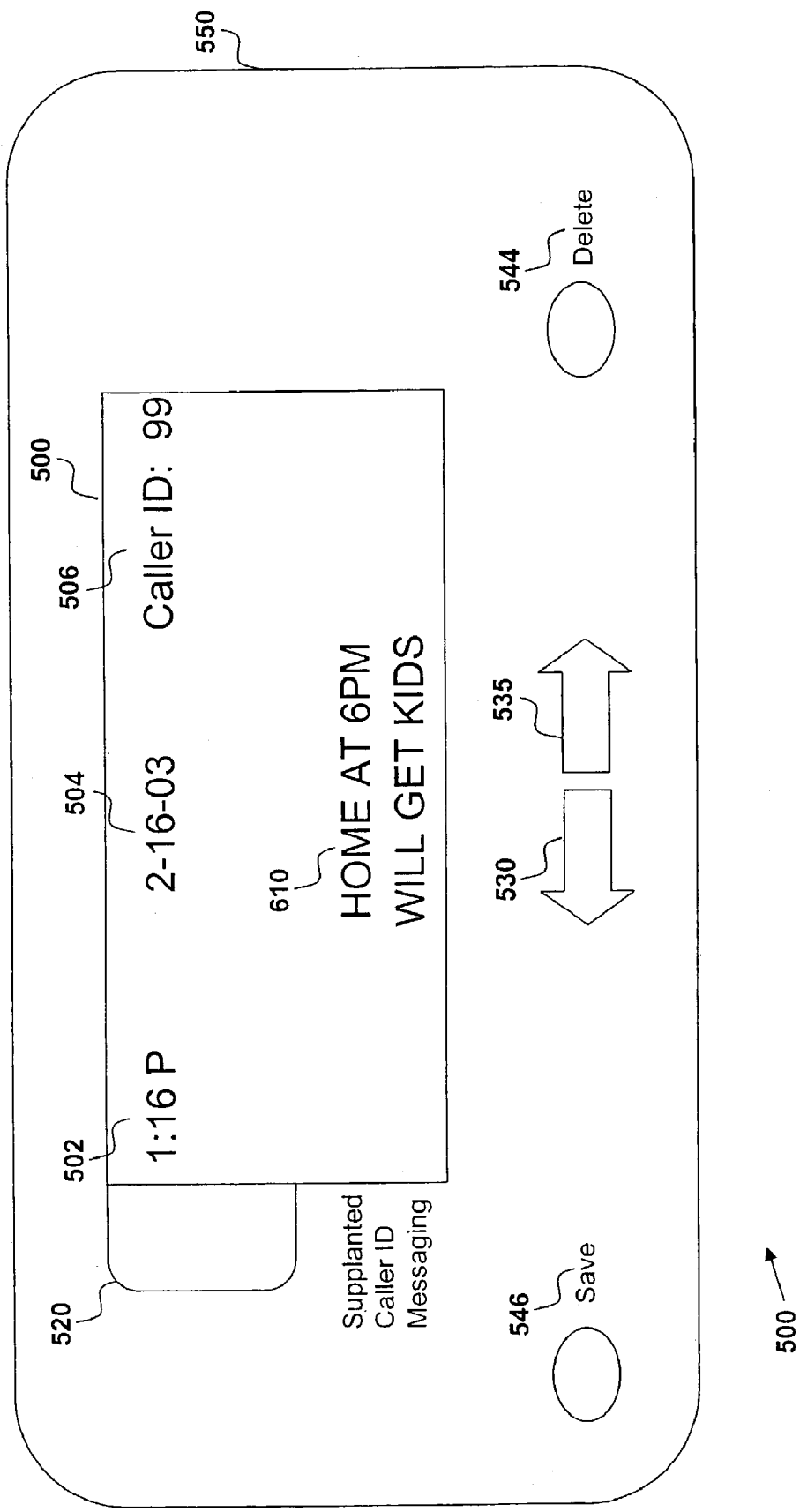
FIG. 6 is a perspective front view of the Caller ID Device of FIG. 5 illustrating the screen display supplanting a Caller ID Message of the Caller ID Messaging Signal for the ICLID signal.

The Caller ID Messaging Signal is routed over the communications network 120 to a receiving party's communications device 120. As illustrated in FIGS. 5 and 6, the receiving party's communications device 120 is a conventional Caller ID device 500. The Caller ID device 500 includes a display screen 500 having a time identifier 502, a date identifier 504, a numeric identifier of an incoming Caller ID signal (e.g., ICLID signal) 506, a lighted panel 520 that alerts the receiving party of a new, incoming, and/or stored Caller ID, a "Save" punch button 546, a "Delete" punch button, a left arrow button 530, a right arrow button 535, and a housing 550 that protects the internal componentry of the Caller ID device 500. Typically, the Caller ID device 500 receives an incoming ICLID signal and displays an originating NANP number 510 (i.e., the telephone number of the calling party) and a name 512 associated with the originating NANP number (shown as "CITY-COUNTY GOV" in FIG. 5). Conventional Caller ID devices comply with standards known in the art that limit the display of the ICLID signal to two lines of text, each line containing approximately fifteen (15) characters. As shown in FIG. 6, this invention supplants the ICLID signal (the NANP number 512 and name 512) with a Caller ID Message 610 of the Caller ID Messaging Signal so that a short personalized message (e.g., the Caller ID Message) is displayed or otherwise presented by conventional Caller ID device 500.

Figure 7:
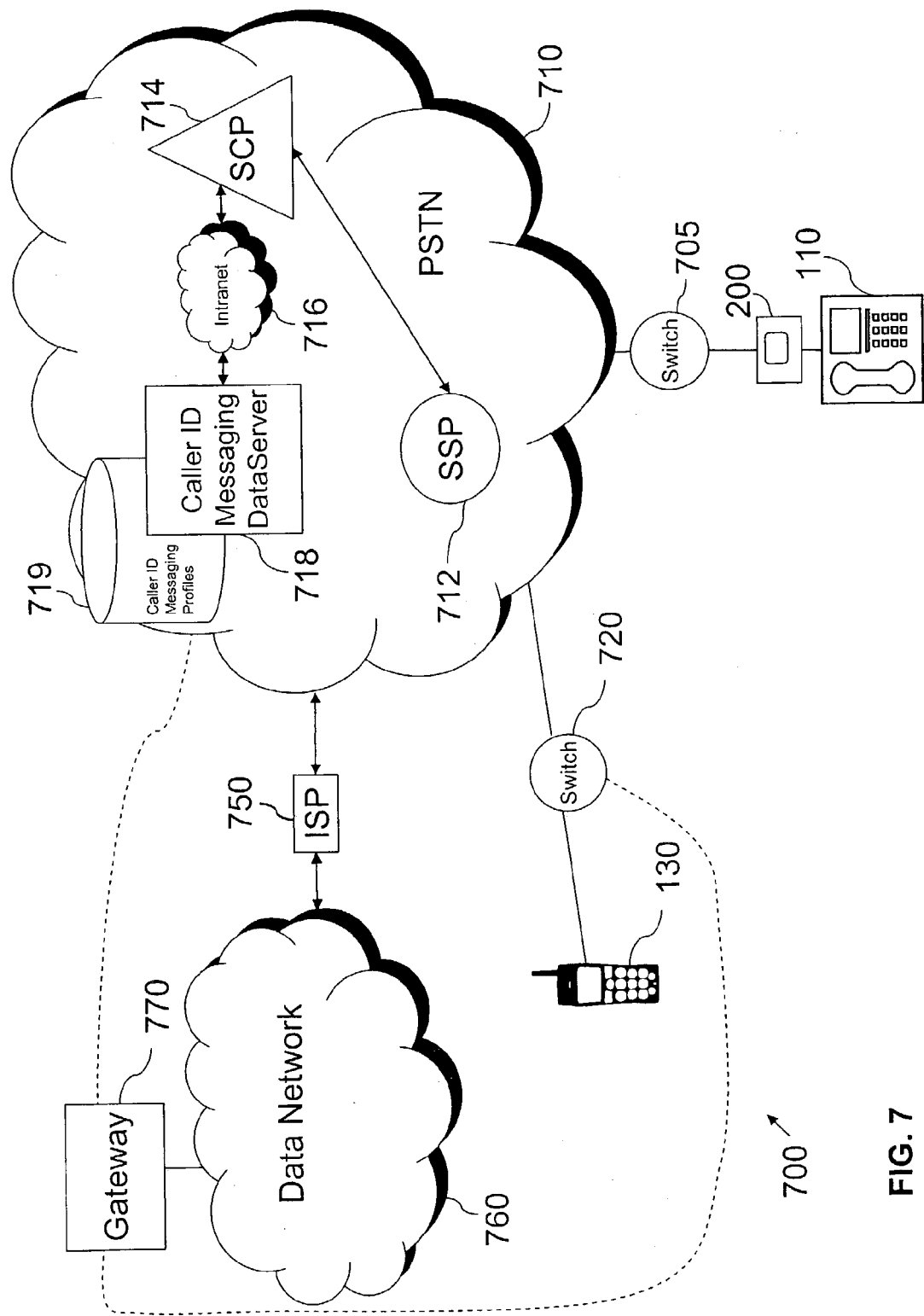
FIG. 7 is a more detailed schematic of a Caller ID messaging communications system further illustrating the communications connections of the calling party's communications device and Caller ID Messaging Device, the communications network(s), and the receiving party's communications device according to an embodiment of this invention.

FIG. 7 is a schematic of a Caller ID messaging communications system 700 illustrating communications connections of the communications network(s) (shown as reference numerals 710 and 760) with the calling party's communications device 110 and the Caller ID Messaging Device 200 and with the receiving party's communications device 130. The Caller ID messaging communications system 700 includes the calling party's communications device 110 (shown as a POTS telephone) connected to the Caller ID Messaging Device 200, a communications switch 705 connected to a telecommunications network 710 that includes a service switching point (SSP) 712, a service control point (SCP) 714, an Intranet 716 (for the telecommunications provider to administer and program the telecommunications network 71 components), a Caller ID Messaging Dataserver 718, a database of one or more Caller ID Messaging Profiles 719, an Internet Service Provider (e.g., America On-Line) 750, a data network 760, a gateway 770, and a second communications switch 720 connected to the receiving party's communications device 130 (shown as an telephone capable of communications with the telecommunications network and with the data network). Each switch 705, 720 allows the connected communications devices 110, 130 to transceive electronic communication signals via the data network 760 (e.g., world wide electronic data network such as an Internet, an Intranet, and/or an Extranet) and/or the telecommunications network 710 (e.g., a central office (CO), a mobile telephone switching office (MTSO), and/or a combination CO/MTSO). The telecommunications network 710 may use any means of coupling one of the switches 705, 720 to the telecommunications network 710, but the coupling means is preferably high-capacity, high-bandwidth optical transport services, Gigabit Ethernet services, and/or the like. As those of ordinary skill in the art of telecommunications understand, the telecommunications network 710 could also link each of the switches 705, 720 via other appropriate means, such as, for example a Synchronous Optical Network (SONET) structure with redundant, multiple rings.

Typically, a customer and/or user of Caller ID Messaging Services (e.g., someone who subscribes to and/or someone who uses Caller ID Messaging Services) uses the Caller ID Messaging Device 200 and/or the calling party's communications device 110 to gain access to the telecommunications network 710. Each Caller ID Messaging Signal sent from the calling party's communications device 110 and/or Caller ID Messaging Device 200 is routed through the telecommunications network 710 via switch 705. The Caller ID Messaging Signal and other communications signals (e.g., ICLID) associated with an address of calling party's communications device 110 arrive at SSP 712 that analyzes the signals and routes the Caller ID Messaging Signal to the SCP 714 and then to the Caller ID Messaging DataServer 718 for further Caller ID Messaging Signal processing and routing information. The Caller ID Messaging DataServer 718 accesses the database 719 of Caller ID Messaging Profiles to determine if the receiving party's communications device blocks Caller ID messaging calls, to access presentation capabilities of the destination communications address and/or the receiving party's communications device 130, and/or to obtain other preferences, instructions, files, and/or associated Caller ID Messaging data as further described below. Thereafter, the telecommunications network 710 may transmit the Caller ID Messaging Signal (or a portion of the Caller ID Messaging Signal, such as just the Caller ID Message) via switch 720 to the receiving party's communications device 130. Alternatively, the telecommunications network 710 may transmit the Caller ID Messaging Signal via ISP 750 (or other connection) to the data network 760. The data network 760 then sends the Caller ID Messaging Signal via the gateway 770 to the receiving party's communications device 130 via switch 130. Still, another alternative, is for the telecommunications network 710 to transmit the Caller ID Messaging Signal directly to the gateway 770 (such as when a Caller ID Messaging Profile associates a static IP address of the receiving party's communications device 130) to transmit to the receiving party's communications device 130 via switch 720. In addition to transmitting the Caller ID Messaging Signal, the telecommunications network 710 may also connect the calling party's communications device 110 with the receiving party's communications device 130 to establish a voice connection (e.g., connect the telephone call). That is, when the receiving party is alerted (via an audible alert and/or visual alert) of the incoming communication(s) (e.g., the Caller ID Message and/or telephone call), the receiving party can review the Caller ID Message (and/or other information transmitted with the Caller ID Messaging Signal) and decide whether to answer the call to have a conversation with the calling party.

Figure 8:
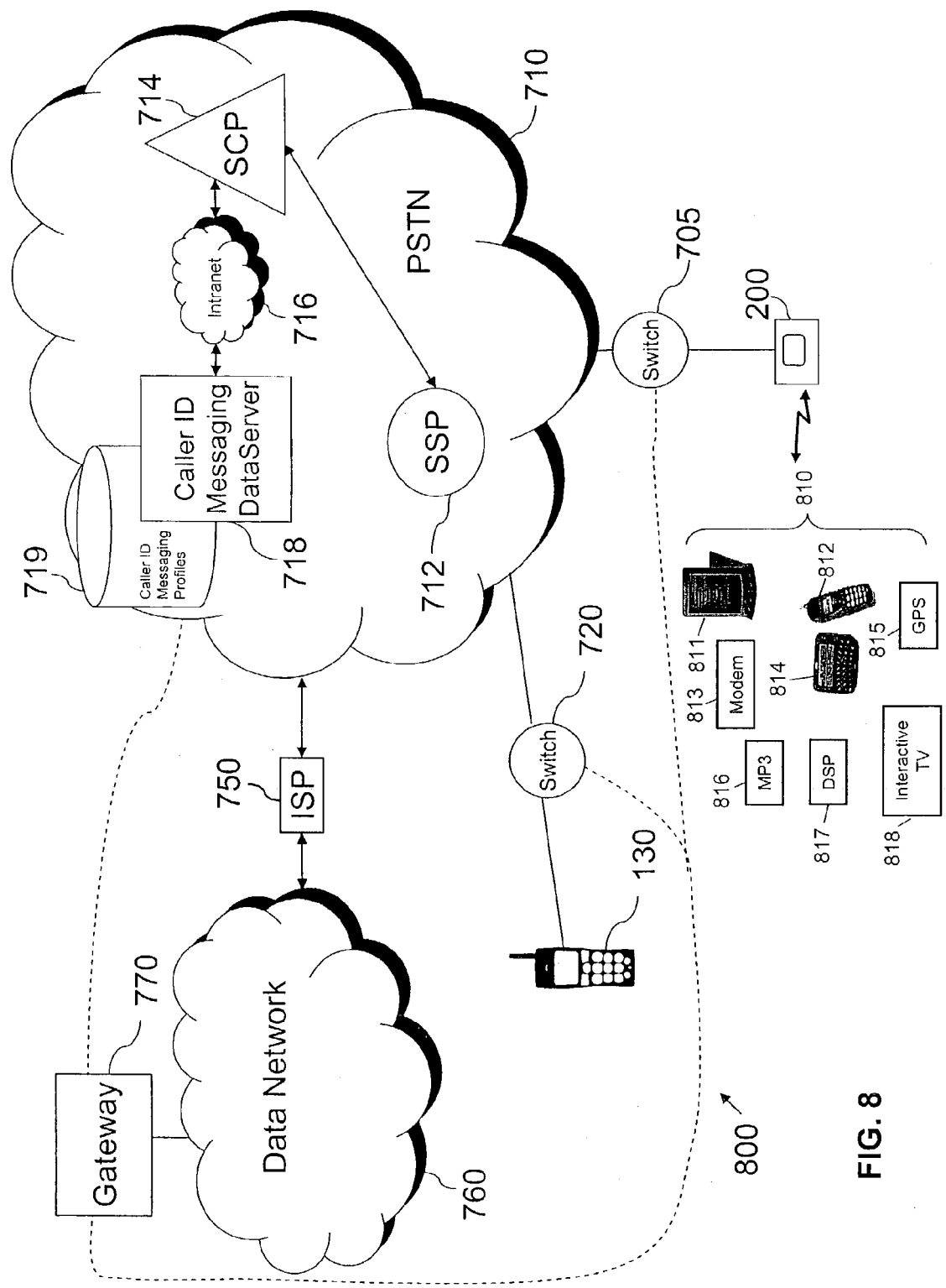
FIG. 8 is a another exemplary schematic of a Caller ID messaging communication system illustrating alternate calling party's communications devices according to an embodiment of this invention.

FIG. 8 is a schematic of a Caller ID messaging communications system 800 similar to the Caller ID messaging communications system 700 disclosed in FIG. 7. However, Caller ID messaging communications system 800 illustrates alternate calling party's communications devices 810 that include a Personal Digital Assistant (PDA) 811, an IP phone 812, a modem 813, an interactive pager 814, a global positioning system (GPS) 815, an MP3 player 816, a digital signal processor (DSP) 817, and an interactive television 818. Regardless of the calling party's communications device (reference numerals 110 and 811–818) used to communicate the Caller ID Messaging Signal, this information may need to be formatted accordingly for the receiving party's communications device (including audio, text (e.g., ASCII), video, other digital formats, and combination thereof). Accordingly, the Comm Device Interface 250 of the Caller ID Messaging Device 200, the Caller ID Messaging DataServer 718 (via the Caller ID Messaging Profile), and/or the gateway 770 of the data network 760 has the intelligence for appropriate formatting of the Caller ID Messaging Signal for transmission to the receiving party's communications device. For example, if the calling party's communications device uses the Wireless Application Protocol (WAP) technique, then the Caller ID Messaging Signal is formatted using the Wireless Mark-up Language (WML) and must be configured for Caller ID standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means. Alternatively, the Caller ID Messaging Signal may be formatted and/or otherwise configured for presentation by an application and/or componentry of the receiving party's communications device 130.

Figure 9:
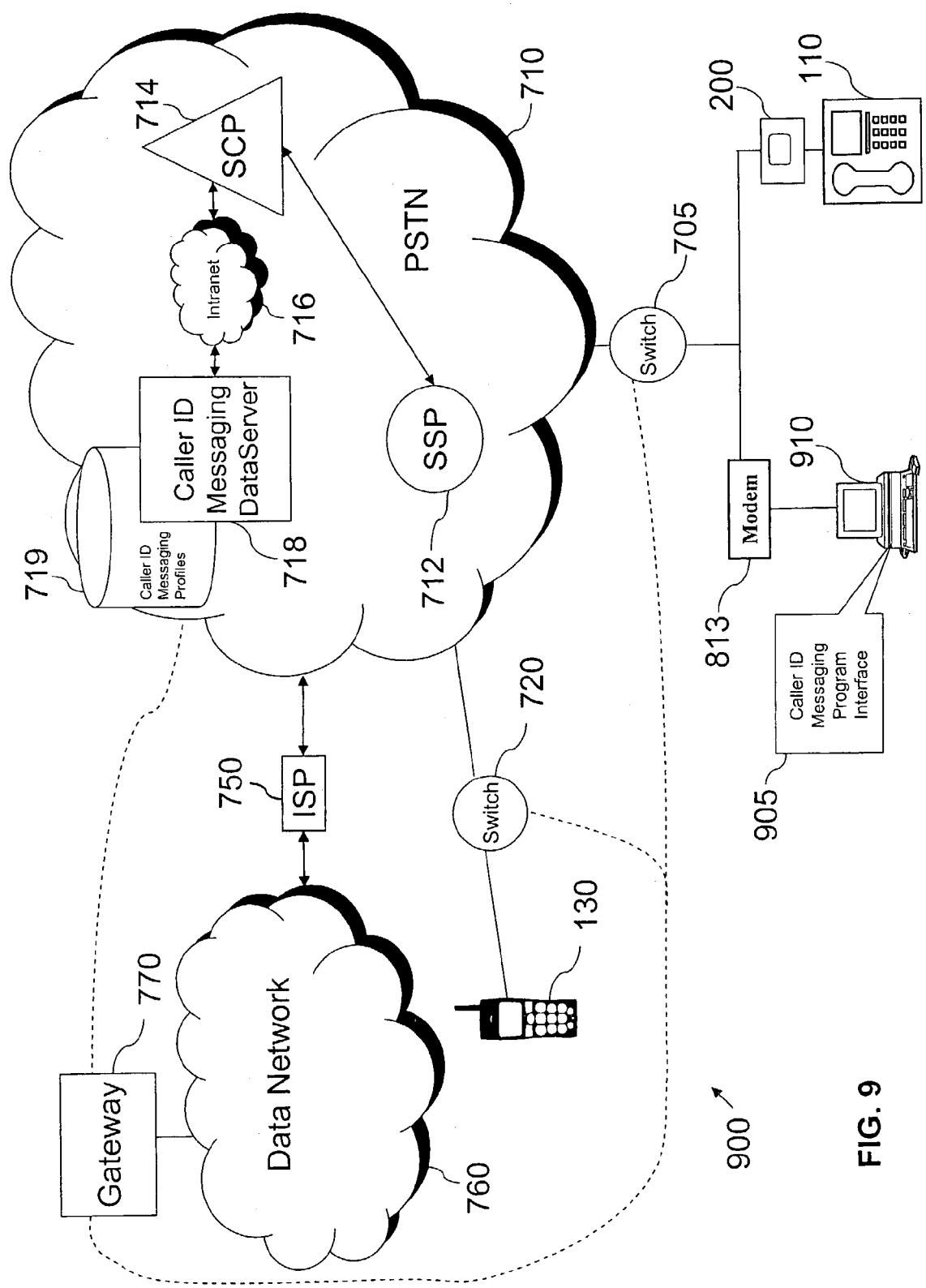
FIG. 9 is another exemplary schematic of a Caller ID messaging communications system illustrating a personal computer having a Caller ID Messaging Program Interface coupled with the modem of FIG. 8 according to an embodiment of this invention.

FIG. 9 is a schematic of a Caller ID messaging communications system 900 similar to the Caller ID messaging communications systems 700 and 800 disclosed in FIGS. 7–8. However, Caller ID messaging communications system 900 illustrates the modem 813 connected to a networked personal computer 910 having a Caller ID Messaging Program Interface 905 as well as calling party's communications device 10 and Caller ID Messaging Device 200. The customer and/or the user interacts with the Caller ID Messaging Program Interface 905 and with Intranet 716 to access and login to the Caller ID Messaging DataServer 718 to establish a Caller ID Messaging Profile in the database 719. Alternatively, an administrator of the telecommunications network 710 could similarly use another personal computer (not shown) and/or alternate workstation (not shown) networked with the Intranet 716 to access, add, delete, store, modify, and manage the database 719 of one or more Caller ID Messaging Profiles. The Caller ID Messaging Profiles control access, sharing, notification, routing, security, transactions, troubleshooting, management, and/or additional processing of Caller ID Messaging Signals exchanged to/from telecommunications network customers, users, and non-customers. More specifically, the Caller ID Messaging Profiles establish preferences for processing the Caller ID Messaging Signal including (1) archiving the Caller ID Messaging Signal to a storage device associated with the telecommunications service provider (so that a database of Caller ID Messaging Signals including Caller ID Messages and destinations communications addresses are stored), (2) encrypting the Caller ID Messaging Signal (or a portion of the Caller ID Messaging Signal) so that only the receiving party's communications device can decipher the Caller ID Message, (3) copying the Caller ID Messaging Signal (e.g., copying the Caller ID Messaging Signal from/to the Caller ID Messaging Device 200), and (4) associating the Caller ID Messaging Signal with a variety of fields, files, and/or other data for Caller ID Messaging Services, such as, for example login information associated with the customer, user, and/or administrator, password, telephone number(s) or Service Node(s) of the customer (this may include a plurality of addresses that are associated with a Service Node or other switch serving the calling party's communications device 110), TCP/IP address of the customer, email address of the customer, profile of the calling party's communications device (shown as reference numerals 110, 811–818 and 910 in FIGS. 1–9) associated with the incoming Caller ID Messaging Signal (e.g., presentation formats of various communications devices), a time or date identifier (e.g., day of week or calendar date), other information associated with the incoming line identification (ICLID) communications signal, size and content of Caller ID Messaging Signal, reply(s), delivery failure notification(s), display and/or presentation data associated with a GUI (e.g., color, font, placement of telecommunications network Management Module on screen, etc.), telecommunications network defaults. Typically, the Caller ID Messaging Profile includes data for (1) the caller identification message, (2) the identifier of the calling party (e.g., a name of the calling party), (3) the identifier of the originating communications address (e.g., a phone number of the calling party's telephone), (4) caller identification messaging services associated with at least one of the calling party and the originating address, (5) the identifier of the destinations communications address (e.g., a telephone number of the receiving party), (6) an identifier of a receiving party's communications device (e.g., a cellular phone), (7) caller identification messaging services associated with at least one of the receiving party and the destinations communications address, and (8) caller identification messaging default service parameters (e.g., always format the caller identification message as text). The data of the Caller ID Messaging Services provide instructions for (1) billing for communication of caller identification messaging signals over the communications network, (2) parameters that enable caller identification messaging including times of day and days of week, (3) parameter that disable caller identification messaging including times of day and days of week, (4) parameters to block caller identification messaging, (5) identification and authentication parameters, (6) parameters to bypass the disable parameters, (7) memory services for data stored with caller identification messaging signals, and/or (8) configuration and formatting preferences for each calling party's communications device communicating with the network. In addition, the data for the Caller ID Messaging Services may include instructions for troubleshooting problems including error messages. Thus, Caller ID Messaging DataServer 718 functions as a computer server, database, and processor that is dedicated to managing Caller ID Messaging Services including communications of Caller ID Messaging Signals over the telecommunications network 710 to other connected networks (e.g., data network 760) and/or connected communications devices (e.g., receiving party's communications device 130).

The telecommunications network 710 may include wired, optical, and/or wireless elements and may further include private network elements, such as private branch exchanges (PBXs), and/or other elements (not shown). The telecommunications network 710 includes Advanced Intelligent Network (AIN) componentry controlling many features of the network. The telecommunications network 710 and/or each of the switches 705, 720 could also include a packet-based "soft switch" that uses software control to provide voice, video, and/or data services by dynamically changing its connection data rates and protocols types. If the telecommunications network 710 and/or one of the switches 705, 72Q should include a softswitch, the AIN componentry is replaced by an application server that interfaces with the softswitch via a packet protocol, such as Session Initiation Protocol (SIP). The means of communicating the Caller ID Messaging Signal between or among the calling party's communications device 110, the Caller ID Messaging Device 200, the switches 705, 720, the telecommunications network 710 including AIN componentry, the data network 760 including the gateway 770, and the receiving party's communications device 130 include a variety of means, including optical transmission of data (e.g., any medium capable of optically transintting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between the calling party's communications device 110, the Caller ID Messaging Device 200, the switches 705, 720, the telecommunications network 710 including AIN componentry, the data network 760 including the gateway 770, and the receiving party's communications device 130, however, are well understood in by those of ordinary skill the art and will not be further described. Further, those of ordinary skill in the art will be able to apply the principles of this invention to their own network configurations which may differ substantially from the communications system(s) shown in the figures.

Figure 10:
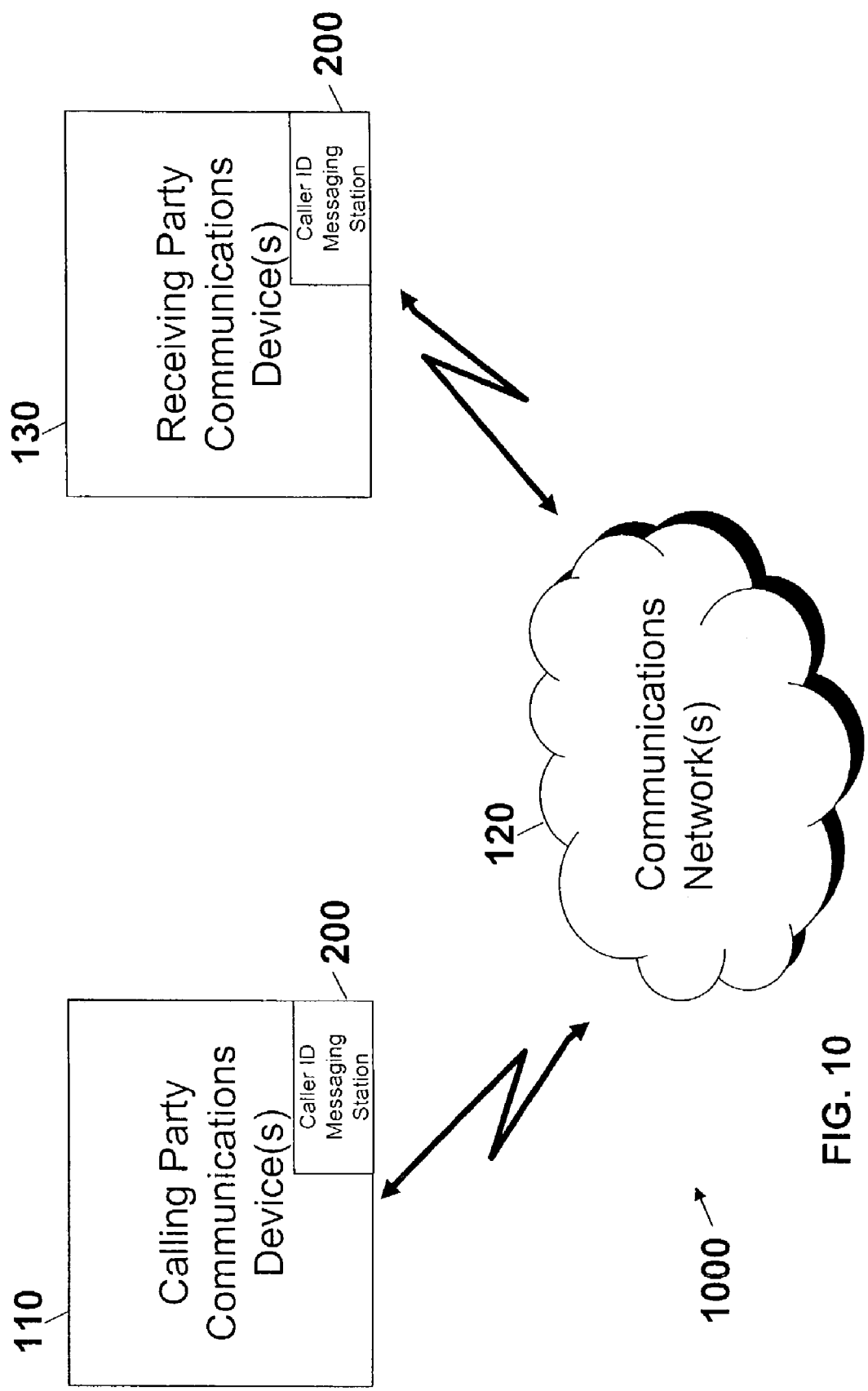
FIG. 10 is a schematic of another Caller ID messaging communications system illustrating a communications network connecting a calling party's communications device with a Caller ID Messaging Device and a receiving party's communications device with a Caller ID Messaging Device according to an embodiment of this invention.
Figure 11:
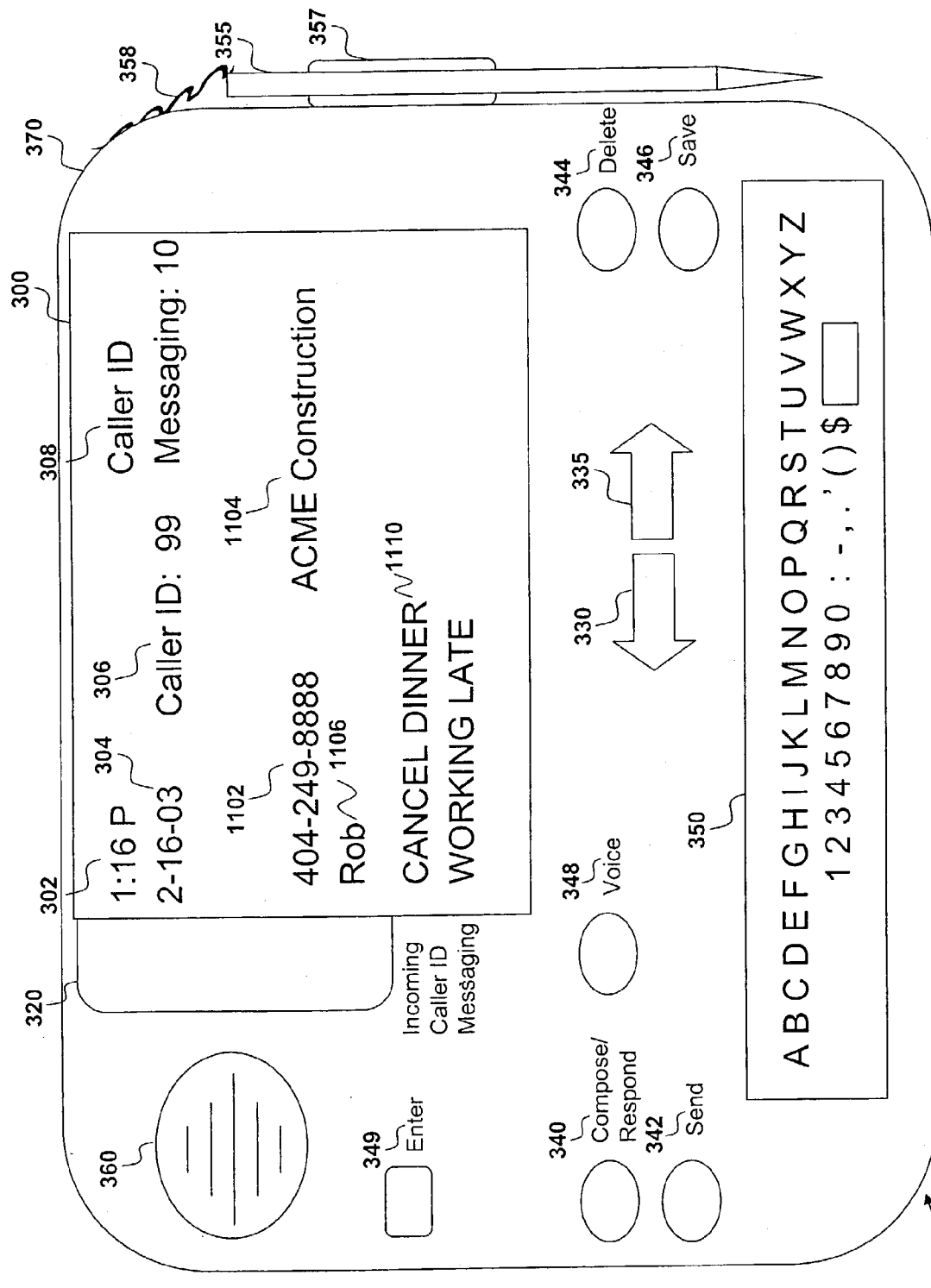
FIG. 11 is a perspective front view of the receiving party's Caller ID Messaging Device of FIG. 10 including a screen display for presenting the caller identification messaging signal according to an embodiment of this invention.

Referring now to FIG. 10, another Caller ID messaging communications system 1000 similar to the Caller ID messaging communications system 100 of FIG. 1 is shown; however, Caller ID messaging communications system 1000 includes the receiving party communications device also having the Caller ID Messaging Device 200. Thus, the calling party communications device 110 and the receiving party communications device 130 each include and/or are coupled with specialized hardware and equipment (i.e., Caller ID Messaging Device 200) to engage in Caller ID messaging. For example, FIG. 11 illustrates the Caller ID Messaging Device 200 of the receiving party presenting the incoming Caller ID Messaging Signal (via display 300). The Caller ID Messaging Device 200 displays the communications address 1102 (e.g., telephone number) associated with the calling party communications device 110, a name and/or identifier of the calling party communications address 1104, a name and/or identifier of the calling party 1106, and the Caller ID Message 1110. While the Caller ID Message 1110 shown in FIG. 11 complies with conventional formatting of Caller ID information (i.e., two lines, each with approximately fifteen characters—Line 1: "CANCEL DINNER", Line 2: "WORKING LATE"), the Caller ID Messaging Device 200 is enabled to display a Caller ID Message having the size of less than or equal to 255 bytes, or alternatively, a Caller ID Message that is transmitted in less than or equal to four (4) seconds. Thus, the display screen 300 is configured to have a display of at least three (3) lines by thirty (30) characters and/or to have a display capable of presenting other visual data (e.g., a picture, a map, etc.).

Figure 12:
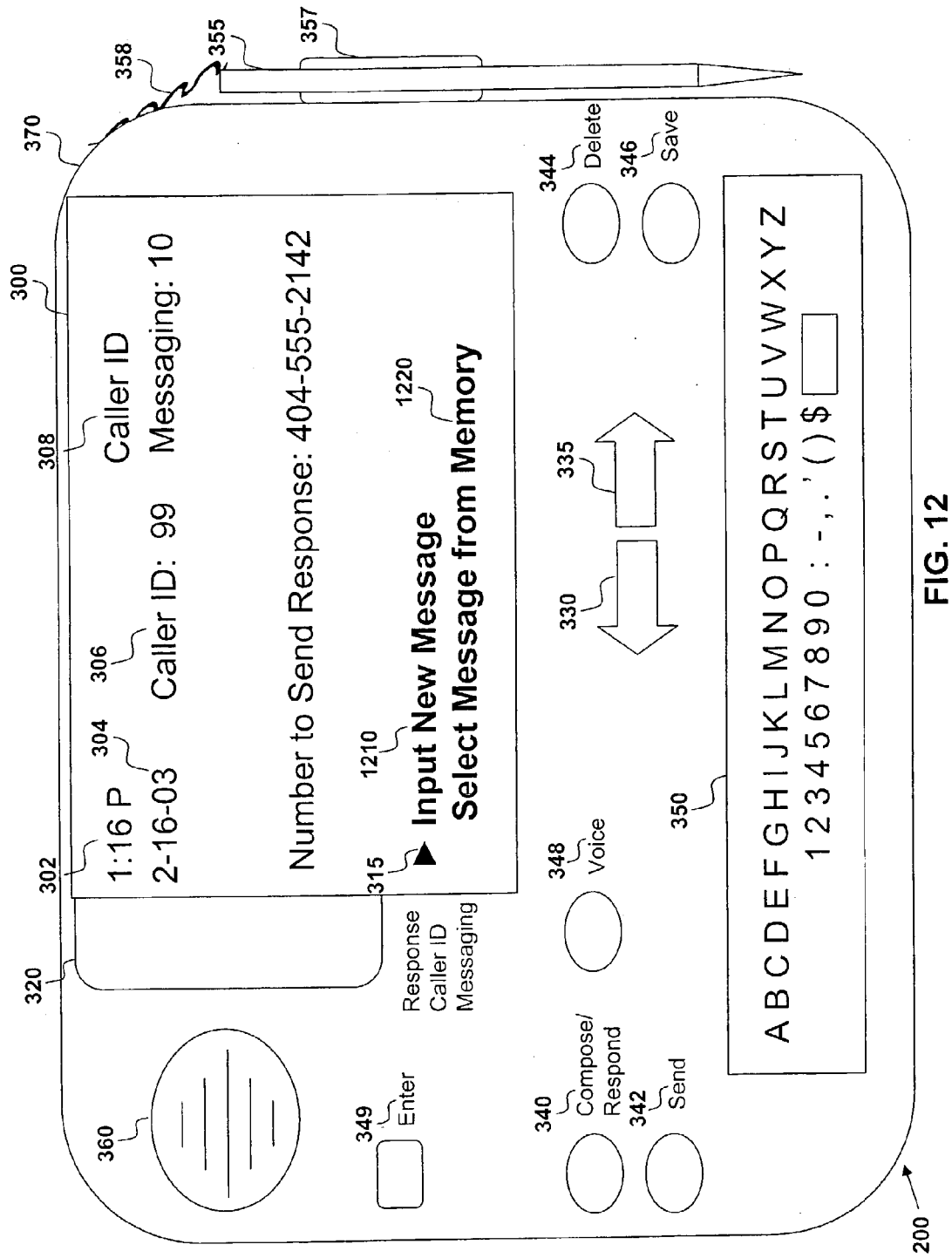
FIG. 12 is a perspective front view of the receiving party's Caller ID Messaging Device of FIG. 10 including a screen display for the selection of inputting a response caller identification message according to an embodiment of this invention.
Figure 13:
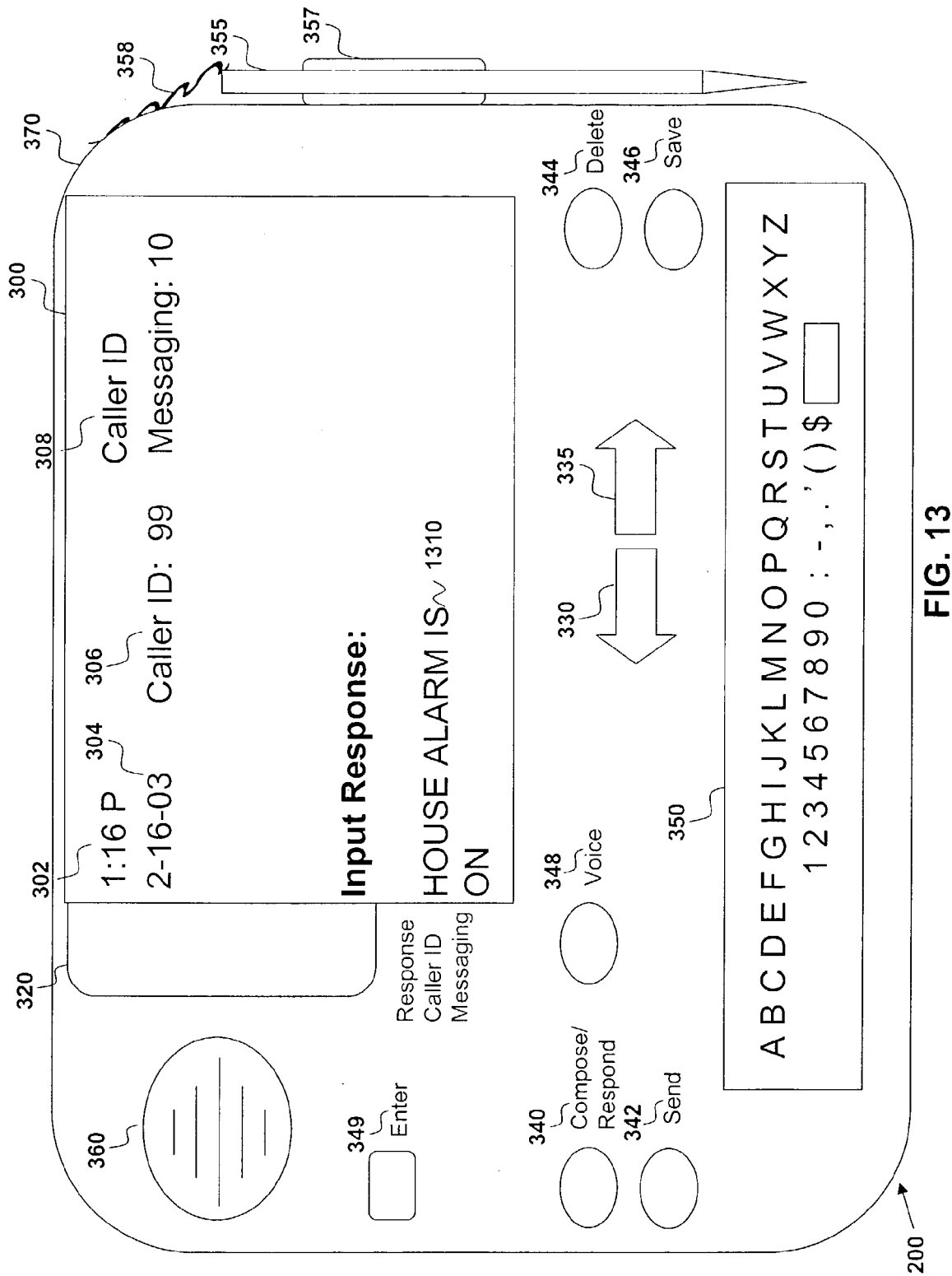
FIG. 13 is a perspective front view of the receiving party's Caller ID Messaging Device of FIG. 12 including a screen display for inputting the response caller identification message according to an embodiment of this invention.

As shown in FIG. 12, the receiving party uses Caller ID Messaging Device 200 to respond to Caller ID Message 1110. To initiate the response, the receiving party punches or presses the "Compose/Respond" button 340 that brings up a response GUI 1210 for the receiving party to select and/or input a response Caller ID Message. The user may select to (1) input a new response or (2) to select a response from memory. For example, if the user uses the right arrow 335 (or left arrow 330) to move pointer 440 on "Input A New Response" and then presses the "Enter" button 349, an Input Response GUI 1310 of FIG. 13 is displayed and the receiving party can use the stylus 355 and/or keyboard 350 to compose the response Caller ID Message. When the receiving party has finished inputting the response Caller ID Message, the receiving party presses the "Send" button 342 and the Caller ID Messaging Device 200 automatically transmits the response Caller ID Messaging Signal with the response Caller ID Message through telecommunications network 710 and/or data network 760 to the calling party communications device 110 for interactive Caller ID Messaging. If, however, the receiving party uses the right arrow 335 to move the pointer 440 on "Select A Response From Memory" and then presses "Enter" button 349, a Select Response GUI (not shown) is displayed with a menu for navigating stored Caller ID Messages (such as, for example, doodles drawn by a user, Caller ID Messages associated with the calling party or receiving party, an alphabetical or numeric listing of Caller ID Messages, search options for finding a stored Caller ID Message, frequently sent Caller ID Messages, and so on) and the receiving party selects the Caller ID Message and presses the "Send" button 342 to transmit the response Caller ID Message. The stored Caller ID Messages may be stored by local memory device 216, by Caller ID Messaging DataServer 718 (via a Caller ID Messaging Profile associated with the receiving party and/or the calling party), or by another peripheral storage device (not shown).

Typically, the original Caller ID Messaging Signal is transmitted similar to Caller ID (e.g., ICLID signals for Caller ID and Caller ID Call Waiting are transmitted with an incoming call). Similarly, response and/or interactive Caller ID messaging (e.g., the calling party responds to the response Caller ID Message) may be communicated with an incoming communications signal. However, alternate embodiments of this invention provide that the response and/or interactive Caller ID messaging is transmitted via an established connection between the calling party communications device 110 (and/or caller id messaging device 200) and the receiving party communications device 130 (and/or caller id messaging device 200 such that a data burst is transmitted and/or received during an active connection (e.g., during a conversation between the calling party and the receiving party).

Figure 14:
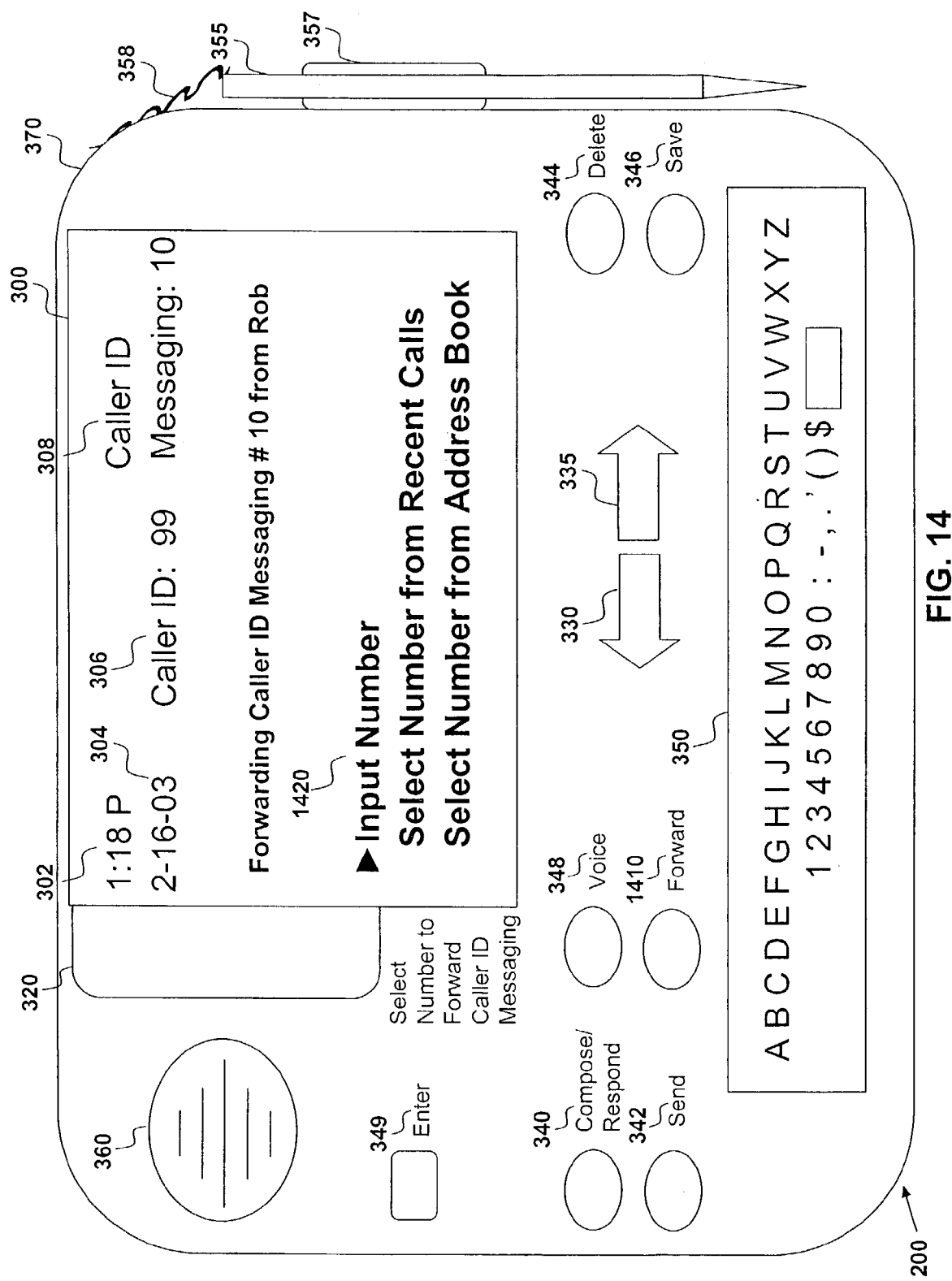
FIG. 14 is a perspective front view of the receiving party's Caller ID Messaging Device of FIG. 10 including a screen display for inputting a forwarded communications address to forward the caller identification messaging signal according to an embodiment of this invention.

As shown in FIG. 14, the receiving party (and/or a calling party) uses a "Forward" button 1410 to forward the Caller ID Message (original Caller ID Message sent from calling party, response Caller ID Message, interactive Caller ID Messages, and/or a stored Caller ID Message). For example, if the receiving party receives the incoming Caller ID Message 1110 and wants to forward the Caller ID Message 1110, the receiving party presses the "Forward" button 1410 that brings up a Forwarding Caller ID Messaging GUI 1420 with an identifier of the Caller ID Message to forward (shown as "Forwarding Caller ID Messaging #10 from Rob in FIG. 14"). Thereafter, the receiving party selects a communications address similar to the methods and systems described in FIG. 4.

Figure 15:
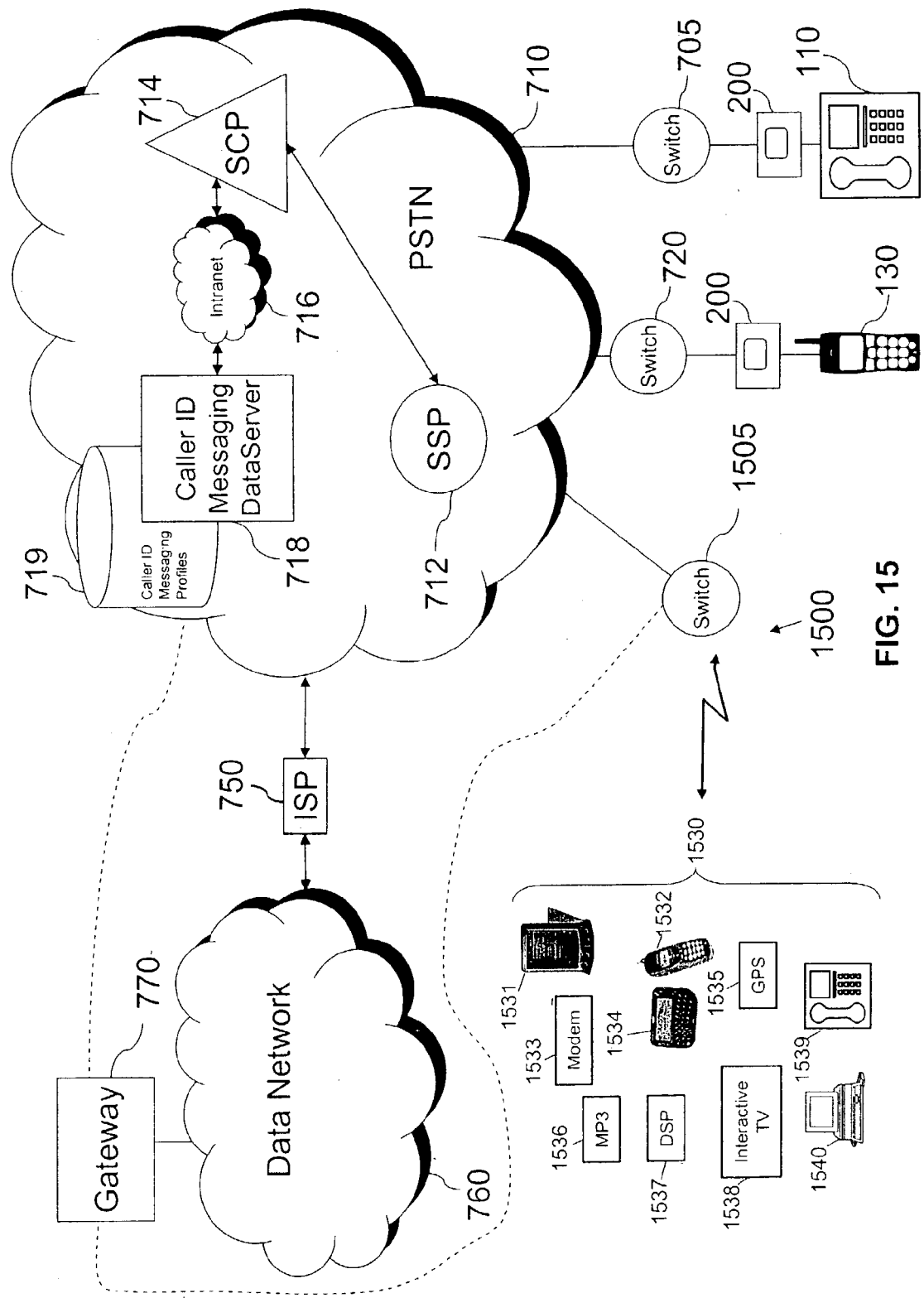
FIG. 15 is a detailed schematic of a Caller ID messaging communications system illustrating the communications connections of a calling party's telephone and Caller ID Messaging Device, a receiving party's communications device and Caller ID Messaging Device, a forwarded party's communications device(s), and the communications network(s) according to an embodiment of this invention.

FIG. 15 illustrates the Caller ID Messaging communications system 1500 similar to the Caller ID Messaging communications system 700 of FIG. 7; however, FIG. 15 further includes one or more third party's communications devices 1530 including a Personal Digital Assistant (PDA) 1531, an IP phone 1532, a modem 1533, an interactive pager 1534, a global positioning system (GPS) 1535, an MP3 player 1536, a digital signal processor (DSP) 1537, an interactive television 1538, a POTS telephone 1539, and a personal computer 1540. One or more of the third party's communications devices 1530 receives the forwarded Caller ID Message similar to the systems and methods described above. In alternate embodiments (not shown), one or more of the third party's communications device 1530 may include and/or be coupled with a Caller ID Messaging Device 200 and use the Caller ID Messaging Device 200 to engage in interactive Caller ID Messaging conferencing (e.g., more than two parties engaged in Caller ID messaging). Still further, the calling party, the receiving party, and the third party could communicate the Caller ID Messaging Signal, the response Caller ID Messaging Signal, and a third party initiated caller identification messaging signal during the voice connection of the calling party and the receiving party.

According to an embodiment, a third party sponsor (e.g., an advertiser, marketing company, family member) could provide a third party sponsored access address (e.g., an 800 number, IP address, etc.) that allows the calling party to establish the communications connection with the receiving party when the calling party (and/or the receiving party) agrees to receive and/or respond to a third party caller identification messaging signal during the voice connection with the receiving party. The third party, as an added incentive, could be billed for the communications connection of the calling party and the receiving party. Thus, the calling party is able to engage in free or reduced rate communications with the receiving party in exchange for viewing, listening, playing, and/or responding to the third party caller identification message. Typically, the calling party calls the third party sponsored access address, inputs the telephone number and/or destination communications address of the receiving party's communications device, inputs and/or confirms the communications address of the calling party's communications device for the transmission of third party caller identification messaging and thereby agrees to receive and/or respond to the caller identification messages. Thereafter, the third party communications sponsor established the communications connection via the communications network between the calling party's communications device and the receiving party's communications device (similar to the connection established when the calling party uses a calling card access number to place a long distance call to the receiving party). The third party sponsor then initiates transmission of the third party sponsored caller identification messaging signals to the calling party's communications device (and/or receiving party's communications device), and thus, the third party sponsor does not need to maintain a voice connection with either the calling party's communications device nor the receiving party's communications device. Rather, the third party sponsor may elect to maintain an alternate communications connection such that the third party maintains a dynamic caller identification messaging communications connection such that only the third party caller identification messaging signals are transmitted to the calling party's communications device and/or the receiving party's communications device. Alternatively, after the communications connection between the calling party and the receiving party, the third party is released from the communications connections, and, thereafter establishes a new communications connection each time the third party caller identification messaging signal is transmitted to the calling party and/or the receiving party (similar to communications of Caller ID Call Waiting signals that are sent when the calling party and the receiving party are engaged in a voice connection). Finally, the third party sponsor may limit the duration of the phone conversation, such as, only agreeing to pay for a set period of time (e.g., 10 minutes), to pay for the communications connection so long as the calling party continues to respond to third party caller identification messages, to pay for the communications connection if the receiving party also agrees to receive and respond to the third party caller identification messages, and other billing arrangements.

In another embodiment, either party (i.e., calling party and/or receiving party) could subscribe to third party sponsored messaging. Here the third party sponsor may store predetermined messages on a computer. When a call is placed or a call is received, the communications network would determine if either party is a subscriber to third-party sponsored Caller ID Messaging. That is, the SCP or the applications server would query a database of Caller ID Messaging customers. If either party is found in the database, the SCP or the application server would then query to see if the subscriber permits or accepts third party sponsored messaging. If the subscriber permits or accepts third party sponsored messaging, these sponsored messages would be retrieved from a computer and delivered to the subscriber. This computer would interface with the communications network. As the calling party and the called party converse, the computer could route the predetermined messages to either party. The Caller ID Messages could be routed via the voice connection and/or via a data connection. The computer, for example, could interface with the SCP, the application server, and/or the switch. The Caller ID Messages could also be stored on the SCP and/or the application server. The computer could also communicate with the SCP, the application server, and/or the switch via the data network. If the subscriber permits or accepts third party sponsored messaging, these sponsored messages would be retrieved from the computer and delivered to the subscriber.

Figure 16:
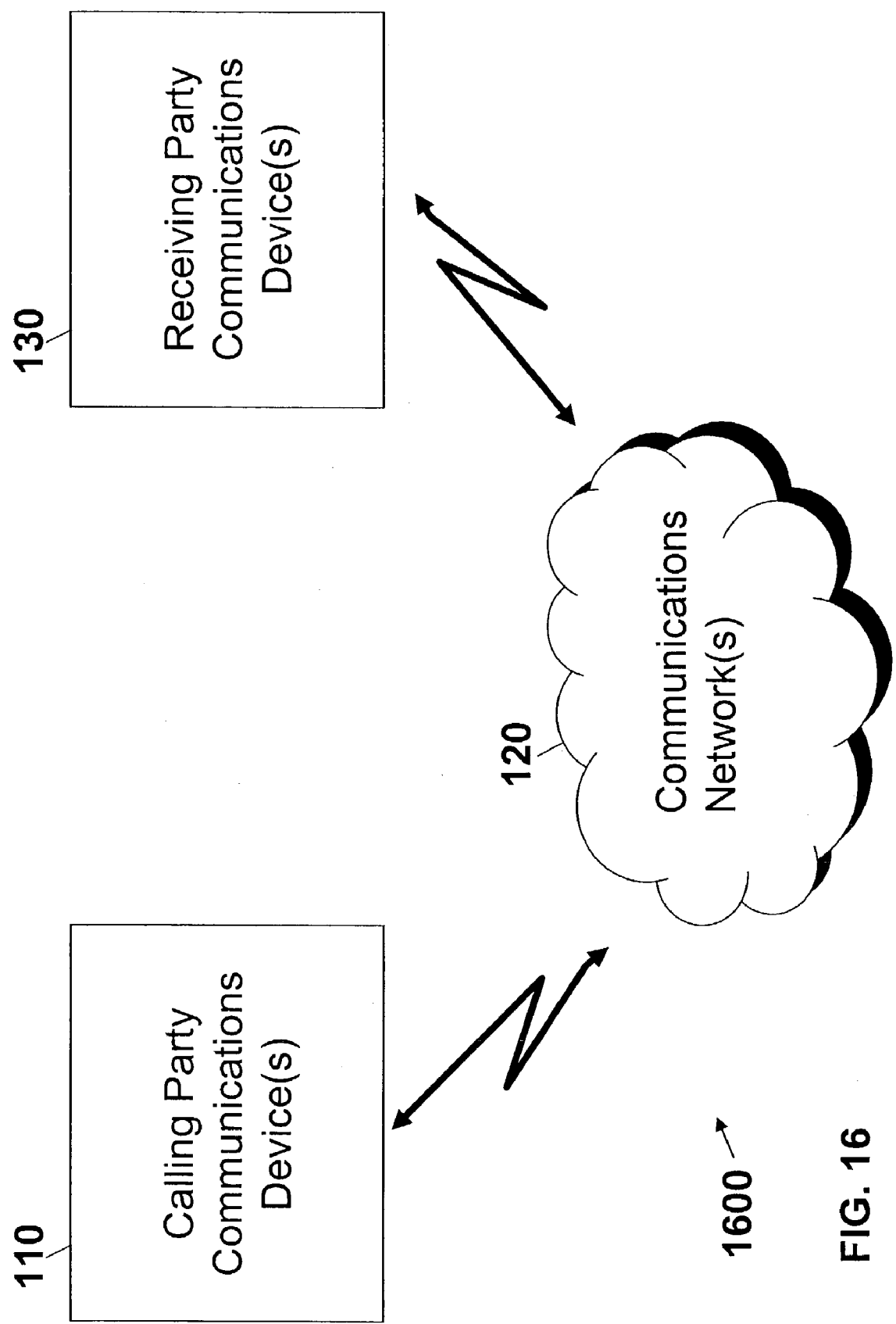
FIG. 16 is a schematic of another Caller ID messaging communications system illustrating a communications network connecting a calling party's communications device and a receiving party's communications device according to an embodiment of this invention.
Figure 17:
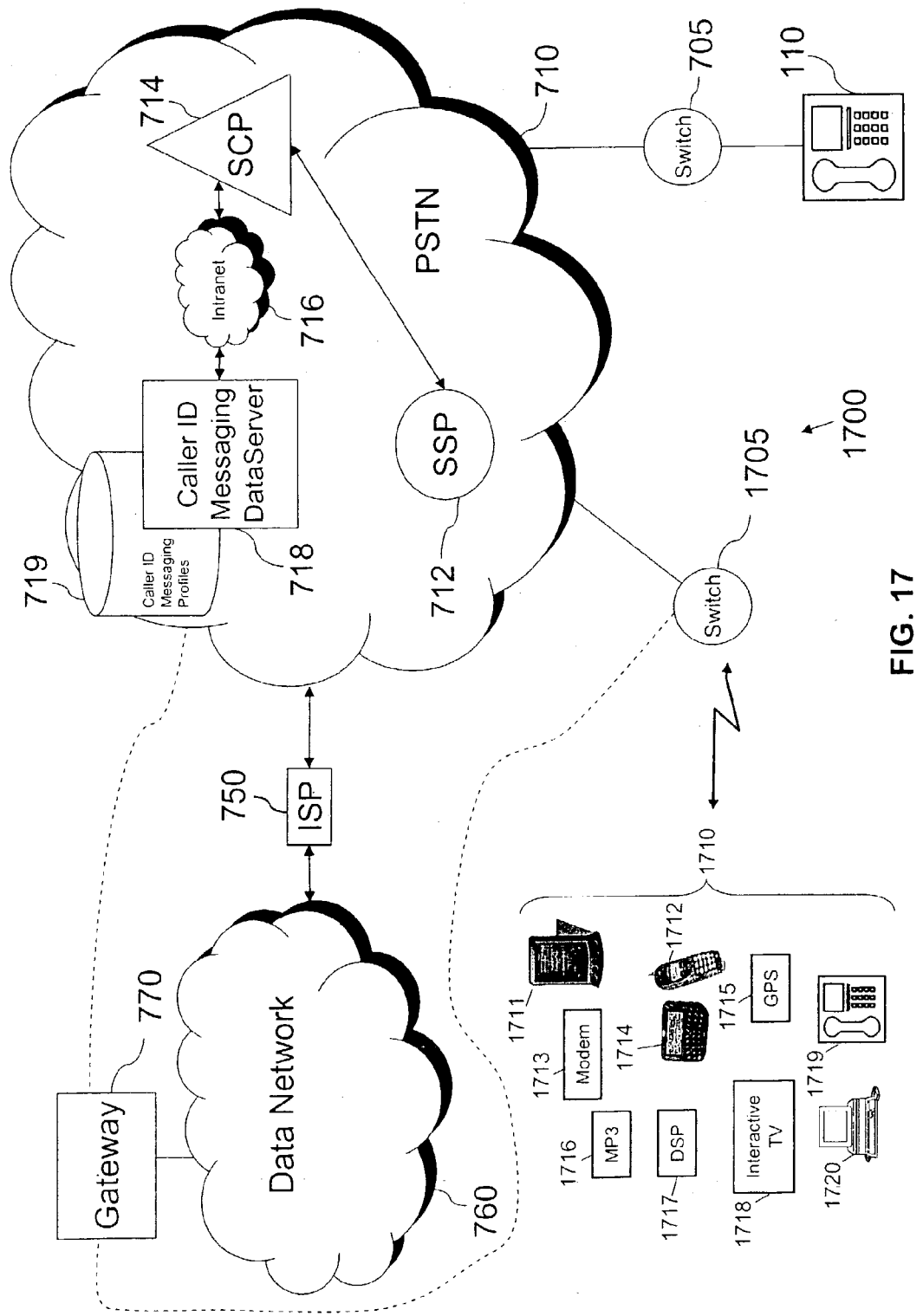
FIG. 17 is a more detailed schematic of the Caller ID messaging communications system of FIG. 16 further illustrating the communications connections of the calling party's telephone, the communications network(s), and a receiving party's communications device according to an embodiment of this invention.

In an alternate embodiment, this invention includes methods and systems for Caller ID Messaging according to the systems disclosed in FIGS. 16–17. FIG. 16 illustrates a Caller ID Messaging Communications system 1600 that includes the calling party communications device 110 and the receiving party device 130 communicating with the communications network 120. Neither the calling party communications device 110 nor the receiving party communications device 130 integrate and/or are coupled with the Caller ID Messaging Device. Rather, the calling party makes use of an access number of the telecommunications network (shown as reference numeral 710 in FIG. 17) to compose, generate, transmit, and/or otherwise manage Caller ID Messaging Signals and Caller ID messaging services. According to FIG. 17, the calling party uses calling party communications device 110 to dial an access number of the telecommunications network 710 for Caller ID messaging (similar to dialing an 800 calling card number). Once the incoming communication from the calling party communications device 110 is connected with the access number, the telecommunications network 710 decodes the incoming communications signal, prompts the calling party for authorization and/or identification (e.g., a pin number associated with a billing number, password, and/or other verification information), associates one or more Caller ID Messaging profiles with the decoded incoming communications signal and/or inputted calling party identification, and presents a menu of options for the calling party to select in order to access stored Caller ID Messaging Signals, compose and/or generate a new Caller ID Messaging Signals including inputting one or more destination communications addresses, and/or manage Caller ID Service. Thereafter, the telecommunications network 710 routes the Caller ID Messaging Signal to one or more receiving party communications devices 1710 similar to the systems and methods described above.

Moreover, the Caller ID Messaging menu presented by telecommunications network 710 may be programmed over a variety of mediums, such as, for example, a voice-activated and/or Dual Tone Multi-Frequency (DTMF) menu prompt. The calling party, for example, might select to access stored Caller ID Messaging Signals by entering a "1" on a touch-tone keypad or by speaking into a receiving audio subsystem and stating the word "one." This entry would then prompt the calling party through choices such as accessing recently sent Caller ID Messaging Signals, alphanumeric listings of each receiving party, and so on. After making a selection, the telecommunications network 710 retrieves the stored Caller ID Messaging Signal from the database 719. In addition, the calling party might enter a code (e.g., "*99") in order to automatically block any exchange of Caller ID Messaging Signals. Similarly the calling party could unblock and allow the exchange of Caller ID messaging by entering another code.

Figure 18:
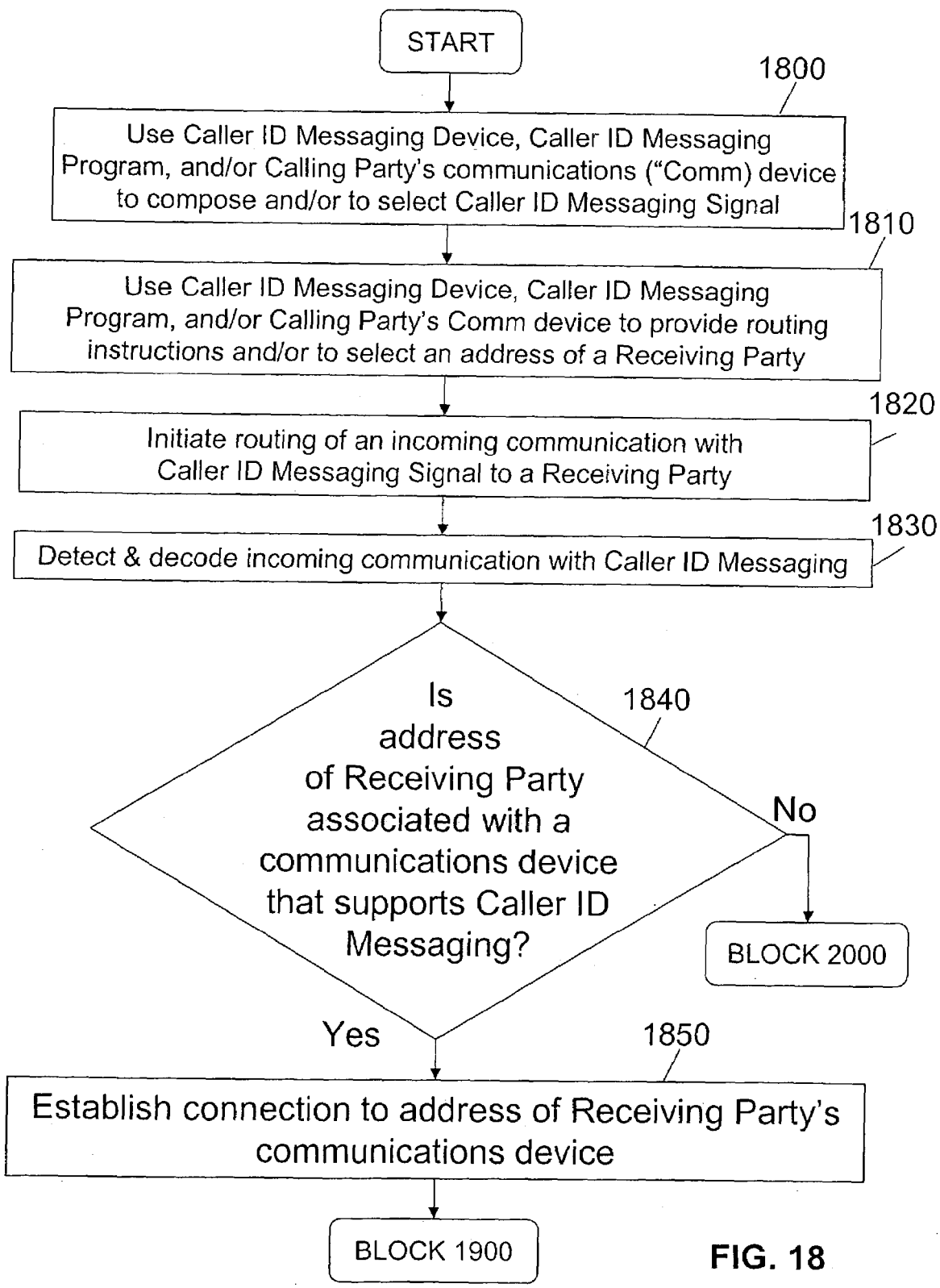
FIGS. 18–20 are flowcharts illustrating communications methods for Caller ID messaging according to embodiments of this invention.
Figure 19:
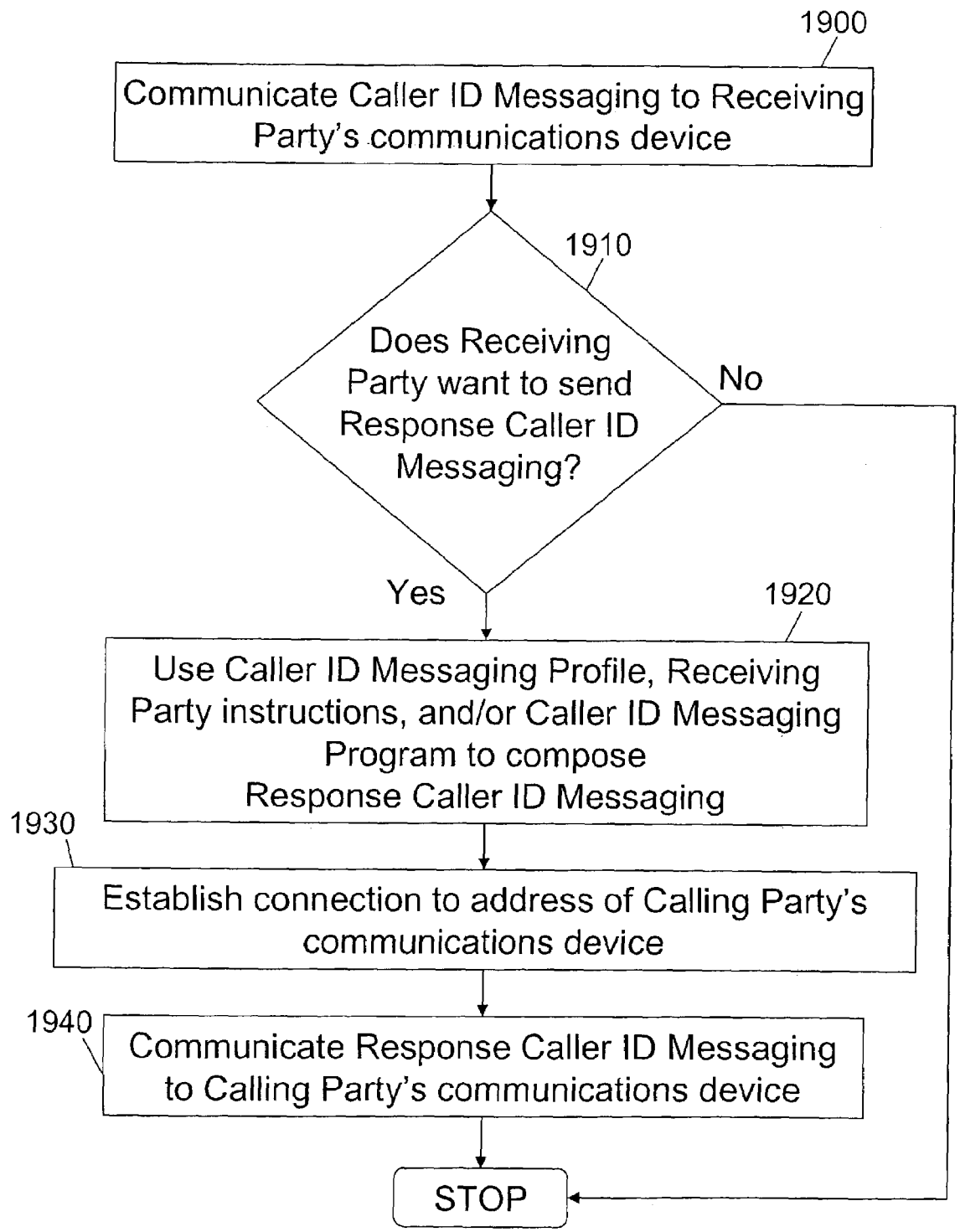
Figure 20:
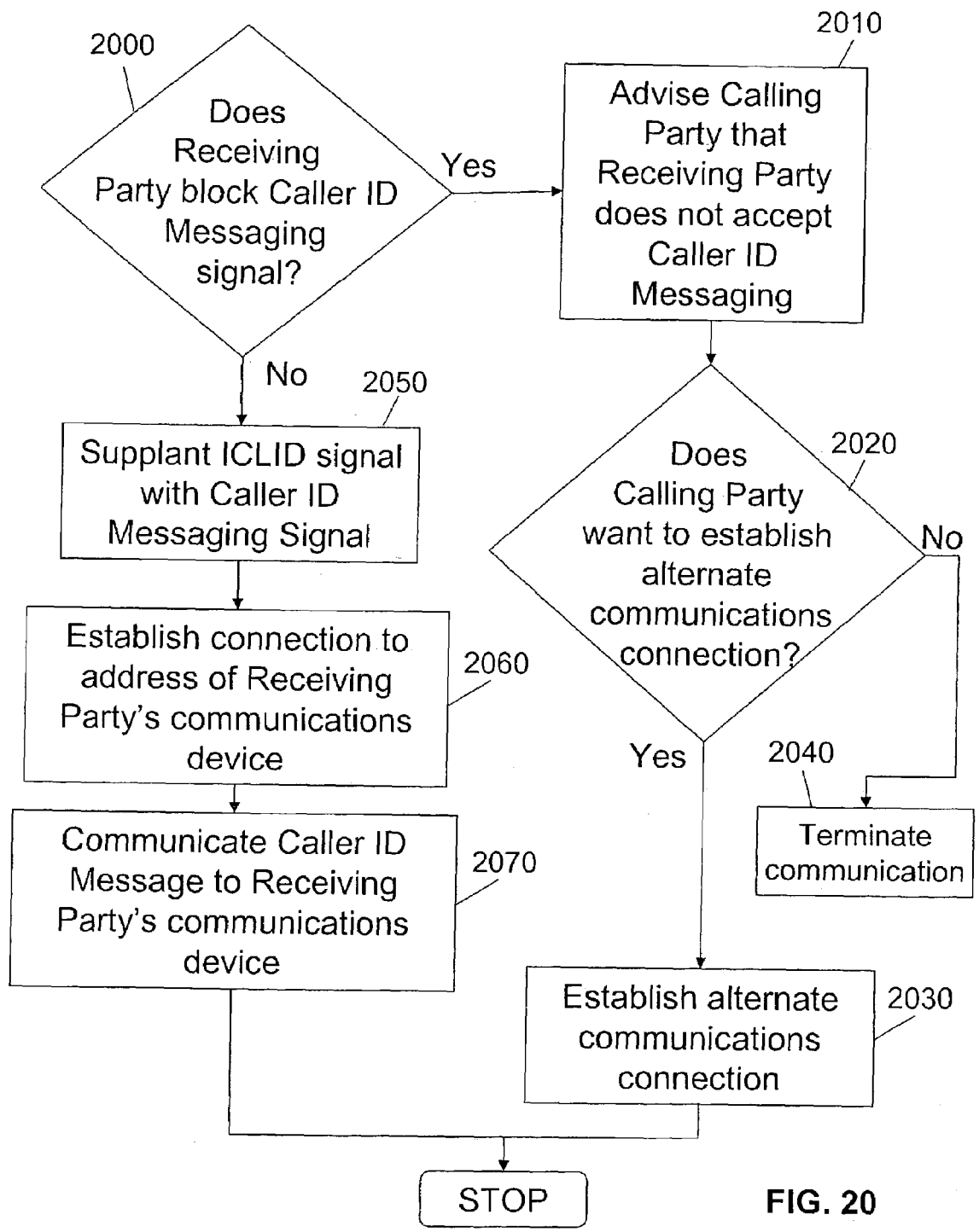

FIGS. 18–20 are flowcharts showing processes of providing the Caller ID Messaging Services according to embodiments of this invention. While the processes in FIGS. 18–20 are shown in series, these processes may occur in different orders and/or at simultaneous times as one of ordinary skill in the art will understand.

A calling party uses a Caller ID Messaging Program (such as reference numeral 214 of FIG. 2) associated with the calling party and/or calling party's communications device to compose and/or to select a Caller ID Message [block 1800] and to input and/or select a destinations communications address (and/or a receiving party that has an associated destinations communications address of the receiving party communications device) [block 1810] for a Caller ID Messaging Signal. Thereafter, the calling party initiates routing of the Caller ID Messaging Signal (such as by pressing the "Send" button 342 of Caller ID Messaging Device 200 disclosed above) and the signal is transmitted to a telecommunications network [block 1820]. The telecommunications network detects and decodes the incoming communications signal (e.g., ICLID) and/or Caller ID Messaging Signal [block 1830] and determines if the receiving party's communications device supports enhanced Caller ID Messaging (e.g., presentation capabilities of the receiving party's communications device, such as whether the receiving party's communications device includes componentry to present more than two lines of text, each line with fifteen characters) [block 1840]. If yes, then the telecommunications network establishes a connection (or alternatively sends a data burst of the Caller ID Messaging Signal) [block 1850] and communicates the Caller ID Messaging Signal to the receiving party communications device [block 1900]. After the Caller ID Message is presented by the receiving party communication device and/or Caller ID Messaging Device, the receiving party decides whether to send a response Caller ID Message [block 1910]. If yes, then the receiving party uses a Caller ID Messaging profile stored by the telecommunications network, the incoming Caller ID Messaging Signal, and/or a Caller ID Messaging Program of the receiving party communications device and/or the receiving party's Caller ID Messaging Device to prepare the response Caller ID Message [block 1920]. The response Caller ID Message is transmitted with a response Caller ID Messaging Signal to the telecommunications network, and the telecommunications network establishes a connection to the address of the calling party communications device [block 1940] and communicates the response Caller ID Messaging Signal [block 1950]. Alternatively, the telecommunications network may use an established connection (such as when the receiving party and calling party are also engaged in a voice connection when the response Caller ID Messaging Signal is sent) to transmit the response Caller ID Messaging Signal. If the receiving party does not want to transmit a response Caller ID Message, then the Caller ID Messaging ends. Although not shown, the receiving party could also elect to forward the incoming or a stored Caller ID Messaging Signal to a third party.

Referring back to "Block 1840," if the receiving party communications device does not support enhanced Caller ID Messaging, then the telecommunications network determines whether the receiving party (and/or receiving party's communications device) blocks or prevents incoming Caller ID messaging [block 2000]. If yes, then the telecommunications network advises the calling party that the receiving party does not accept Caller ID messaging [block 2010] and determines whether the calling party wants to establish an alternate communication connection such as a voice connection (if the Caller ID Messaging Signal is just transmitted as a data transmission to the Caller ID Messaging Device) [block 2020]. If yes, then the telecommunications network establishes the alternate communications connection [block 2030]. However, if the calling party does not want to establish alternate communications, then the communication is terminated [block 2040]. Referring back to "Block 2000," if the receiving party and/or the receiving party's communications device does not block Caller ID messaging, then the telecommunications network supplants the ICLID signal with the Caller ID message of the Caller ID messaging signal [block 2050], establishes a connection to the address of the receiving party's communications device [block 2060], and communicates the Caller ID message to the receiving party's communications device [block 2070].

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) don't have to purchase an expensive SSP and/or SCP to process telephone calls. This next-generation packet network represents an alternative operating environment for the Caller ID Messaging systems, methods, programs, and apparatuses. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic data communications network) to interoperate. Accordingly, this invention is intended to include those other variations, modifications, and alternate embodiments that adhere to the spirit and scope of this invention.

What is claimed is:

1. A method for caller identification messaging, comprising:

establishing a communications connection between a calling party communications device and a receiving party communications device, the communications connection comprising a voice connection and a data connection;

communicating a caller identification messaging signal, the caller identification messaging signal comprising a caller identification message and at least one of (i) an identifier of a calling party, (ii) a communications address of the calling party communications device, (iii) an identifier of a receiving party, (iv) a communications address of the receiving party communications device, (v) an identifier of a third party, and (vi) an identifier of a communications address of the third party, the caller identification message comprising data retrieved from the caller identification messaging device, the data comprising a user specified text message, a user specified visual message, a user specified visual doodle, pre-selected user-specified data stored in a database of caller identification messaging profiles of the caller identification messaging device, and real-time data input into the caller identification messaging device, wherein the caller identification messaging signal is communicated via a communications network to at least one of a receiving party communications device, a calling party communications device, and a third party communications device; and communicating a response caller identification messaging signal, the response caller identification messaging signal comprising a response caller identification message comprising response data retrieved from another caller identification messaging device, the response data comprising a user specified response text message, a user specified response visual message, a user specified response visual doodle, pre-selected user-specified response data stared in a database of caller identification messaging profiles of the other caller identification messaging device, and real-time data input into the other caller identification messaging device, wherein the response caller identification messaging signal is communicated via a communications network to at least one of a receiving party communications device, a calling party communications device, and a third party communications device.

2. The method of claim 1, wherein the communications connection is established when at least one of (1) an incoming communications signal of the calling party communications device is answered by the receiving party communications device and (2) the caller identification messaging signal of the caller identification messaging device is communicated to at least one of the calling party communications device, the receiving party communications device, and the third party communications device.

3. The method of claim 1, the communications network comprising at least one of a public switched telephone network and a mobile switching telephone communications network.

4. The method of claim 1, the calling party communications device comprising at least one of:
the caller identification messaging device,
a caller identification device,
a wireless communications device,
a mobile phone,
a wireless phone,
a WAP phone,
a satellite phone
a computer,
a modem,
a pager,
a digital music device,
a digital recording device,
a personal digital assistant,
an interactive television,
a digital signal processor, and
a Global Positioning System device.

5. The method of claim 1, the receiving party communications device comprising at least one of:
a caller identification device,
the caller identification messaging device,
a wireless communications device,
a mobile phone,
a wireless phone,
a WAP phone,
a satellite phone
a computer,
a modem,
a pager,
a digital music device,
a digital recording device,
a personal digital assistant,
an interactive television,
a digital signal processor, and
a Global Positioning System device.

6. The method of claim 1, the third party communications device comprising at least one of:
the caller identification messaging device,
a wireless communications device,
a mobile phone,
a wireless phone,
a WAP phone,
a satellite phone
a computer,
a modem,
a pager,
a digital music device,
a digital recording device,
a personal digital assistant,
an interactive television,
a digital signal processor, and
a Global Positioning System device.

7. The method of claim 1, wherein the communications network further comprises a world wide electronic data communications network having a caller identification messaging interface via at least one of an internet, an intranet, or an extranet, the caller identification messaging interface accessible via at least one of a caller identification messaging program of the caller identification messaging device.

8. The method of claim 1, wherein the communications network further comprises a world wide electronic data communications network having a caller identification messaging interface via at least one of an internet, an intranet, or an extranet, the caller identification messaging interface accessible via at least one of a caller identification messaging program interface residing in memory of at least one of the calling party communications device, the receiving party communications device, and the third party communications device and a caller identification messaging program interface residing in memory of the receiving party communications device.

9. The method of claim 1, wherein the caller identification message further comprising at least one of text, voice, video, and electronic data.

10. The method of claim 1, further comprising:
if the calling party communications device displays a conventional incoming line identification signal, then substituting the caller identification message for the incoming line identification signal and communicating the caller identification message to the destinations communications address; and
if the calling party communications device comprises a caller identification messaging device to enhance display, then communicating the caller identification messaging signal to the destinations communications address.

11. The method of claim 1, further comprising:
if the receiving party communications device displays the conventional incoming line identification signal, then substituting the caller identification message for the incoming line identification signal and communicating the caller identification message to the destinations communications address, if the receiving party communications device comprises a caller identification messaging device to enhance display, then communicating the caller identification messaging signal to the destinations communications address.

12. The method of claim 1, further comprising:

processing a response caller identification messaging signal, the response caller identification messaging signal comprising a response caller identification message, wherein the response caller identification message comprises at least one of text, voice, video, and electronic data; and routing the response caller identification messaging signal to an origination communications address, the origination communications address comprising at least one of the calling party communications device, the receiving party communications device, and the third party communications device and the origination communications address associated with originating the caller identification messaging signal; and processing the caller identification messaging signal to the origination communications address.

13. The method of claim 1, wherein the caller identification messaging signal further comprises (vii) a caller identification messaging services associated with at least one of the receiving party and the communications address of the receiving party, (viii) the identifier of the third party, (ix) a caller identification messaging default service parameters.

14. The method of claim 13, the caller identification messaging services providing instructions for at least one of (i) billing for caller identification messaging signals, (ii) a parameter that enables caller identification messaging, (iii) a parameter that disables caller identification messaging, (iv) a parameter to block caller identification messaging, (v) identification and authentication parameter, (vi) a parameter to bypass the disable parameter, (vii) memory services for data stored with caller identification messaging signals, and (viii) configuration and formatting preferences for at least one of the calling party communications device, the receiving party communications device, and the third party communications device.

15. The method of claim 1, further comprising:

billing the third party for the communications link, the communications link comprising at least one of a voice connection between the calling party communications device and the receiving party communications device and a caller identification messaging connection for transmitting the caller identification message.

* * * * *